(12) United States Patent
Shimizu et al.

(10) Patent No.: US 8,098,280 B2
(45) Date of Patent: Jan. 17, 2012

(54) MOVING OBJECT LOCATING DEVICE, MOVING OBJECT LOCATING METHOD, AND COMPUTER PRODUCT

(75) Inventors: Seiya Shimizu, Kawasaki (JP); Asako Kitaura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1402 days.

(21) Appl. No.: 11/642,820

(22) Filed: Dec. 21, 2006

(65) Prior Publication Data

US 2008/0049105 A1 Feb. 28, 2008

(30) Foreign Application Priority Data

Aug. 28, 2006 (JP) ................................. 2006-230471

(51) Int. Cl.
*G01C 21/00* (2006.01)
(52) U.S. Cl. ......... 348/116; 348/169; 701/207; 701/223
(58) Field of Classification Search .................. 348/148, 348/169, 116; 701/207, 223; 382/102
See application file for complete search history.

(56) References Cited

U.S. PATENT DOCUMENTS

| 6,038,074 | A  | * | 3/2000  | Kitaguchi et al. | ............ | 359/618 |
| 6,477,260 | B1 | * | 11/2002 | Shimomura | ................... | 382/106 |
| 6,721,444 | B1 | * | 4/2004  | Gu et al. | ........................ | 382/154 |
| 7,403,669 | B2 | * | 7/2008  | Aoyama | ........................ | 382/281 |

FOREIGN PATENT DOCUMENTS

| JP | 11-083480 | 3/1999 |
| JP | 2000-337887 | 12/2000 |
| JP | 2006-054662 | 2/2006 |

OTHER PUBLICATIONS

Nister et al., "Visual Odometry for Ground Vehicle Applications", 2006, Journal of Field Robotics, 23(1), 3-90.*
Hiemes, et al, "Automatic Generation of Intersection Models for Digital Maps for Vision-Based Driving on Innercity Intersections", 2000, IEEE Intelligent Vehicles Symposium, available at Ieeexplore.ieee.org.*
Gehrg et al. "System Architecuter for an Intersection Assistance Fusing Image, Map, and GPS Information", 2003, Vehicles Symposium, available at Ieeexplore.ieee.org.*

* cited by examiner

*Primary Examiner* — Kevin Bates
(74) *Attorney, Agent, or Firm* — Staas & Halsey LLP

(57) ABSTRACT

Camera installation flexibility on a moving object can be increased and accuracy in identifying the moving object improved by identifying a moving object origin trajectory as a potential position at which the moving object origin exists under the following conditions:

1) A distance between the moving object origin position and a reference virtual camera is constant.
2) A direction of virtual camera VCij as viewed from the moving object coordinate system (moving object origin $O_m$) is constant (angle formed by two lines that direct to marker $P_j$ and to the moving object origin position $C_{ij}$ as viewed from the virtual camera VCij is constant.)
3) Virtual camera VCij exists on marker circle (angle between markers $P_i$ and $P_j$ as viewed from virtual camera VCij is constant).

It is possible to identify the position of moving object M by calculating the intersecting point of each moving object origin trajectory T upon multiple trajectories of moving object origin existing.

6 Claims, 18 Drawing Sheets

MOVING OBJECT LOCATING DEVICE, MOVING OBJECT LOCATING METHOD, AND COMPUTER PRODUCT

CROSS-REFERENCE TO RELATED APPLICATIONS

This application is based upon and claims the benefit of priority from the prior Japanese Patent Application No. 2006-230471, filed on Aug. 28, 2006, the entire contents of which are incorporated herein by reference.

BACKGROUND OF THE INVENTION

1. Field of the Invention

The present invention relates to a technology of locating a moving object to track down a location of the moving object.

2. Description of the Related Art

As a method for measuring position of moving object, a global positioning system (GPS) has been widely utilized. Although positioning by GPS alone has an accuracy of about 10 meters (m) and GPS is practical as a positioning technology for navigation services to guide a driver, its accuracy is insufficient as the method for high-level vehicle control such as intervention control or automatic vehicle control.

In addition, although use of a GPS (e.g., real time kinematic (RTK) and virtual reference station-real time kinematic (VRS-RTK), etc.) enables accuracy within centimeters, however, problems such as high cost, deterioration of accuracy resulting from an effect of a reflected wave, and long recovery time to original status after the electromagnetic wave is disrupted such as by a tunnel, etc., make use of difficult to use this method on actual road.

Another positioning method takes photographs of multiple markers using a camera mounted on a moving object and executes position-locating using an angle that is formed between two lines from the camera to the markers. FIG. 16 illustrates such a position-locating method that uses an angle formed by two lines directing from camera mounted on a moving object to the markers of which photographs were taken by the camera.

As shown in FIG. 16, if positions of multiple markers $P_1$, $P_2$, $P_3$, ... are known, two markers $P_i$, $P_j$ (i, j=1, 2, 3, ..., here i≠j) observed by camera and the moving object exists on the same circle (marker circle $E_{ij}$) having a center position $O_{ij}$ expressed by equation 1.1 and a radius $r_{ij}$ expressed by equation 1.2.

$$O_{ij} = \left( \frac{P_{ix} + P_{jx}}{2}, \frac{P_{iy} + P_{jy}}{2} \right) - \frac{1}{\tan\theta_{ij}} \left( \frac{P_{jy} - P_{iy}}{2}, -\frac{P_{jx} - P_{ix}}{2} \right) \quad (1.1)$$

$$r_{ij} = \frac{1}{2\sin\theta_{ij}} \sqrt{(P_{jx} - P_{ix})^2 (P_{jy} - P_{iy})^2} \quad (1.2)$$

In equation 1.2, $\theta_{ij}$ is an inter-marker angle that is formed by the lines directed from camera to two markers $P_i$ and $P_j$. $\theta_{ij}$ is calculated using photographic images taken from the moving object origin $O_m$. When more than 3 markers are detected, since it is possible to obtain multiple marker circles $E_{ij}$ from equations 1.1 and 1.2, it is possible to obtain the moving object position continuously by calculating an intersecting point of these marker circles $E_{ij}$ (as shown in FIG. 16, $E_{12}$ and $E_{23}$).

Although the method is able to obtain the position of the moving object with high accuracy, a method to measure angle of a line directed to the marker having a measuring range of 360 degrees in reference to the moving object origin $O_m$ is required. Therefore, use of a special all-direction camera having the optical center at the moving object origin $O_m$ is required.

FIG. 17 is a diagram showing an example of images taken by an optical system of an all-direction camera and the relevant optical system. As shown FIG. 17, a projection plane f is formed by a side surface of a cylinder with a circle line going through the optical center as the center axis Y. The projected image is recorded with its horizontal axis in correspondence with an azimuthal angle θ. Thus, it is possible to calculate easily the marker azimuthal angle and inter-marker angle (as shown in FIGS. 17, $\theta_{12}$ and $\theta_{23}$) from the horizontal pixel position of the projected image of the markers.

In order to realize such an all-direction camera, for example in Japanese Patent Application Laid-Open Publication No. H11-83480, a mechanism that rotates the camera 360 degrees about the optical center as an axis is equipped, and in Japanese Patent Application Laid-Open Publication No. 2000-337887, an optical system including a special reflector plate and lens is utilized.

Further, without using such an all-direction camera, there also exist various types of systems and products that create a panorama image with a 360 degree field of view by use of a plurality of cameras. FIG. 18 shows an example of an image taken when a plurality cameras CM1 to CM3 is mounted on a vehicle. As shown in FIG. 18, each camera CM1 to CM3 is able to take an image of marker $P_1$, $P_2$, $P_3$, ... that is located within the field of vision. By combining cameras CM1 to CM3 multiple times, it is possible to generate the peripheral view (For example, see Japanese Patent Application Laid-Open Publication No. 2006-54662).

Devices employing conventional technology using the described all-direction camera become mechanically complex, expensive in cost and large in size. In addition, when mounting the all-direction camera on a moving object, it is necessary to place it in a location such that a 360 degree field of vision is obtained. For moving objects such as vehicles, camera mounting is typically limited to the roof of the vehicle, i.e., installation flexibility is significantly low. Especially for automobiles, since the exterior design is very important, the lack of flexibility has been a serious problem that imposes a severe limitation on vehicle style relative to camera mounting.

For other conventional technologies employing a plurality of cameras, problems related to deviations from the optical center of each camera CM1 to CM3 have not been actively addressed. For example, as shown in FIG. 18, although direction of the markers $P_1$, $P_2$, and $P_3$ photographed by the camera CM1 to CM3 can be measured based on unique coordinate system of camera CM1 to CM3 (shown by circle in FIG. 18), there has been a problem that it was impossible to measure direction of $P_1$, $P_2$, and $P_3$ in case optical center is taken as moving object origin Om because of offset of optical center of camera CM1 to CM3, or even if it is not impossible, accuracy of measurement is insufficient (indicated by reference character "x" in FIG. 18).

SUMMARY OF THE INVENTION

It is an object of the present invention to at least solve the above problems in the conventional technologies.

A computer-readable recording medium according to one aspect of the present invention stores therein a program for locating a moving object by using a plurality of images taken outside the moving object with a plurality of cameras mounted on the moving object. The program causes a computer execute detecting a position and a direction for a first marker, a second marker, and a third marker contained in the images; identifying a first origin trajectory relating to an unknown origin position for the moving object based on the first marker and the second marker; identifying a second origin trajectory relating to the unknown origin position based on the second marker and the third marker; and locating the unknown origin position at coordinates of an intersecting point of the first origin trajectory and the second origin trajectory.

An apparatus according to another aspect of the present invention is for locating a moving object by using a plurality of images taken outside the moving object with a plurality of cameras mounted on the moving object. The apparatus includes a detecting unit that detects a position and a direction for a first marker, a second marker, and a third marker contained in the images; a first identifying unit that identifies a first origin trajectory relating to an unknown origin position for the moving object based on the first marker and the second marker; a second identifying unit that identifies a second origin trajectory relating to the unknown origin position based on the second marker and the third marker; and a locating unit that locates the unknown origin position at coordinates of an intersecting point of the first origin trajectory and the second origin trajectory.

A method according to still another aspect of the present invention is of locating a moving object by using a plurality of images taken outside the moving object with a plurality of cameras mounted on the moving object. The method includes detecting a position and a direction for a first marker, a second marker, and a third marker contained in the images; identifying a first origin trajectory relating to an unknown origin position for the moving object based on the first marker and the second marker; identifying a second origin trajectory relating to the unknown origin position based on the second marker and the third marker; and locating the unknown origin position at coordinates of an intersecting point of the first origin trajectory and the second origin trajectory.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Exemplary embodiments according to the present invention will be explained in detail below with reference to accompanying drawings.

The example herein employs a plurality of conventional cameras to detect the markers in lieu of an all-direction camera. For vehicles equipped with a plurality of cameras at the front, sides, rear, etc., for obtaining a peripheral view relevant to the vehicle, these existing cameras may be utilized.

Figure 1:
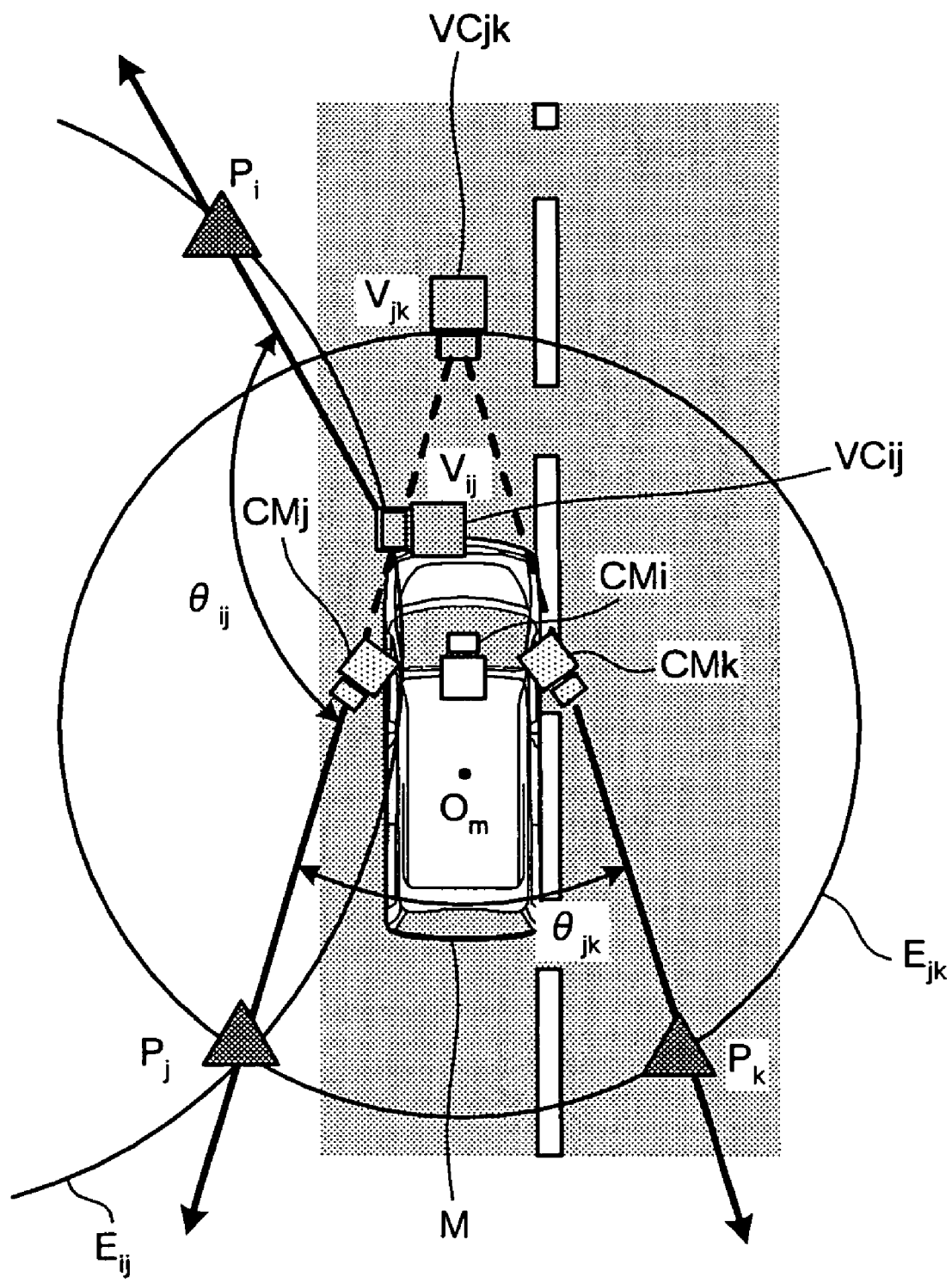
FIG. 1 is a diagram showing a locating method of a moving object according to an embodiment of this invention.

FIG. 1 is a diagram showing a principle of moving object-locating according to an embodiment of this invention. The moving object-locating assumes a virtual camera VCij (i.e., an optical center of camera) at a position from where cameras CMi and CMj (i, j=1, 2, 3, i≠j) mounted on a moving object M can simultaneously photograph two markers $P_i$ and $P_j$. This camera is herein called "virtual camera $VC_{ij}$", and an installation position of this camera is herein expressed as $V_{ij}$.

To distinguish a camera CMi mounted on a moving object M from the virtual camera VCij, the former may be called as a "Real camera CMi". Here, "Marker" means a photograph subject of the camera CMi, for example, a traffic signal, a road traffic sign, a structural body such as a utility pole, or an item that is attached to such a body and is recognizable from the surrounding area.

For the following descriptions and equations, an operation principle is explained using a pair of markers $P_i$ and $P_j$ that are photographed by cameras CMi and CMj and as the principle is identical, explanation is omitted regarding a pair of markers $P_j$ and $P_k$ that are photographed by cameras CMj and CMk.

As shown in FIG. 1, the virtual camera VCij is virtually located at a position from which two markers $P_i$ and $P_j$ that are actually photographed by different cameras CMi and CMj mounted on the moving object M may be photographed simultaneously. That is, the virtual camera VCij is virtually located at an intersecting point of a straight line that passes through the camera CMi and the marker $P_i$ and a straight line that passes through the camera CMj and the marker $P_j$.

And, a virtual camera VCjk is virtually located at a position from which two markers $P_j$ and $P_k$ that are actually photographed by different cameras CMj and CMk mounted on the moving object M. That is, the virtual camera VCjk is virtually installed at an intersecting point of a straight line that passes through the camera CMi and the marker $P_j$ and a straight line that passes through the camera CMk and the marker $P_k$.

In this way, the virtual camera VCij is located at a position where the inter-marker angle $\theta_{ij}$ can be calculated and assuming a moving object origin $O_m$ to be the optical center, the position $V_{ij}$ of virtual camera VCij on a moving object coordinate system can be calculated from the direction of cameras CMi and CMj and markers $P_i$ and $P_j$. Similarly, the virtual camera VCjk is set up at a position where the inter-marker angle $\theta_{jk}$ can be calculated and assuming the moving object origin $O_m$ to be the optical center, the position $V_{jk}$ of virtual camera VCjk on a moving object coordinate system can be calculated from the direction of cameras CMj and CMk and markers $P_j$ and $P_k$.

In the described related art, a circle that passes through the marker markers Pi and Pj. and the moving object origin Om was called the marker circle Eij, however in this embodiment, a circle with a center position Oij and a radius rij that passes through the markers Pi and Pj and the installation position Vij of virtual camera VCij is called the marker circle Eij. The marker circle can identify a circle with its center position Oij and radius rij (shown in FIG. 1, Eij and Ejk) by substituting the inter-marker angle $\theta_{ij}$ having a base at the virtual camera VCij into equations 1.1 and 1.2.

Figure 2A:
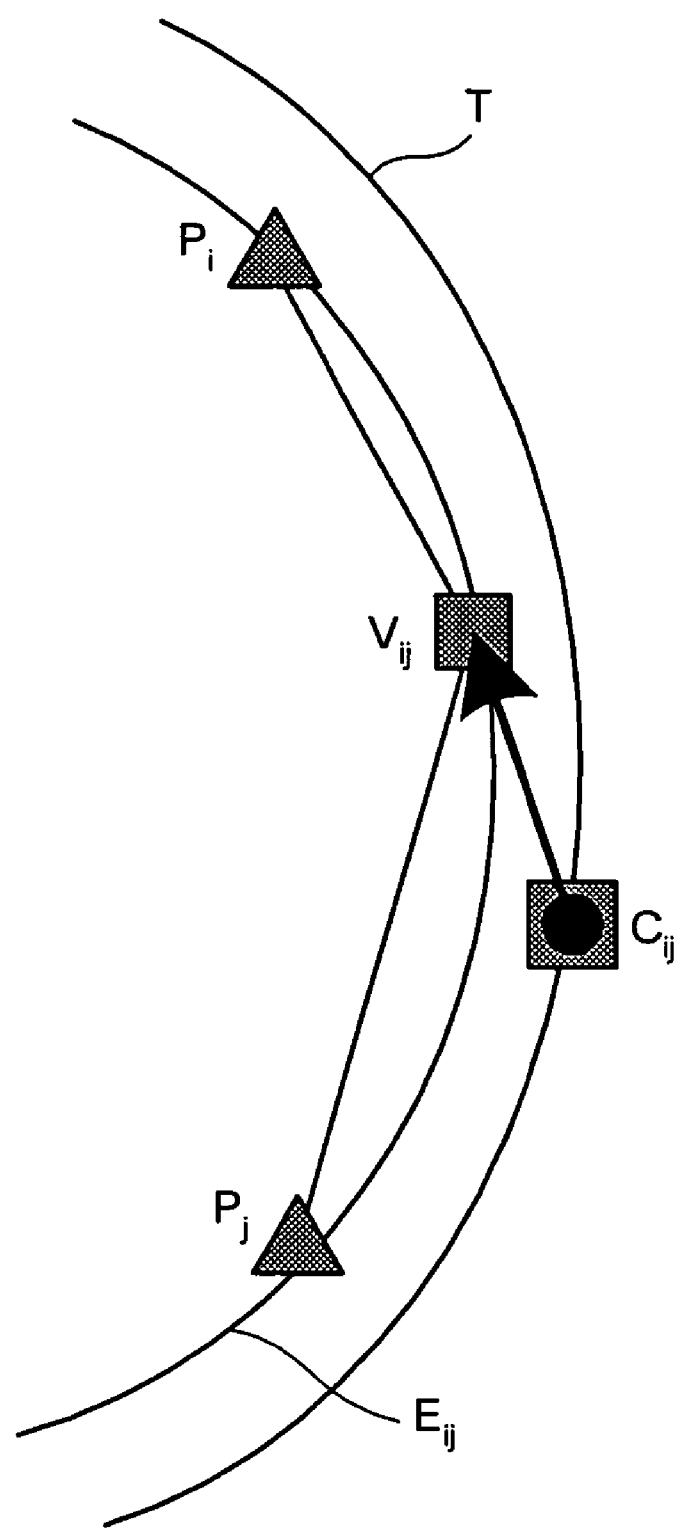
FIG. 2 is a diagram showing a moving object origin trajectory according to an embodiment of this invention.

From the relative position relationship between the installation position $V_{ij}$ of virtual camera VCij and the moving object origin position, a moving object origin trajectory T that becomes a position candidate where the moving object origin position $C_{ij}$ exists is identified. FIG. 2A is a diagram showing the moving object origin trajectory T according to an embodiment of this invention. The moving object origin trajectory T is an aggregate of position coordinates that satisfy conditions 1 to 3 following.

condition 1: a distance d between the moving object origin position $C_{ij}$ and the virtual camera VCij is constant.

condition 2: a direction of virtual camera VCij as viewed from the moving object coordinate system (moving object origin $O_m$) is constant (angle formed by two lines that direct to marker $P_j$ and to the moving object origin position $C_{ij}$ as viewed from the virtual camera VCij is constant.)

condition 3 the virtual camera VCij exists on the marker circle $E_{ij}$ (or, angle formed by two lines that direct to the marker $P_i$ and $P_j$ starting from the virtual camera position VCij is constant.)

Figure 2B:
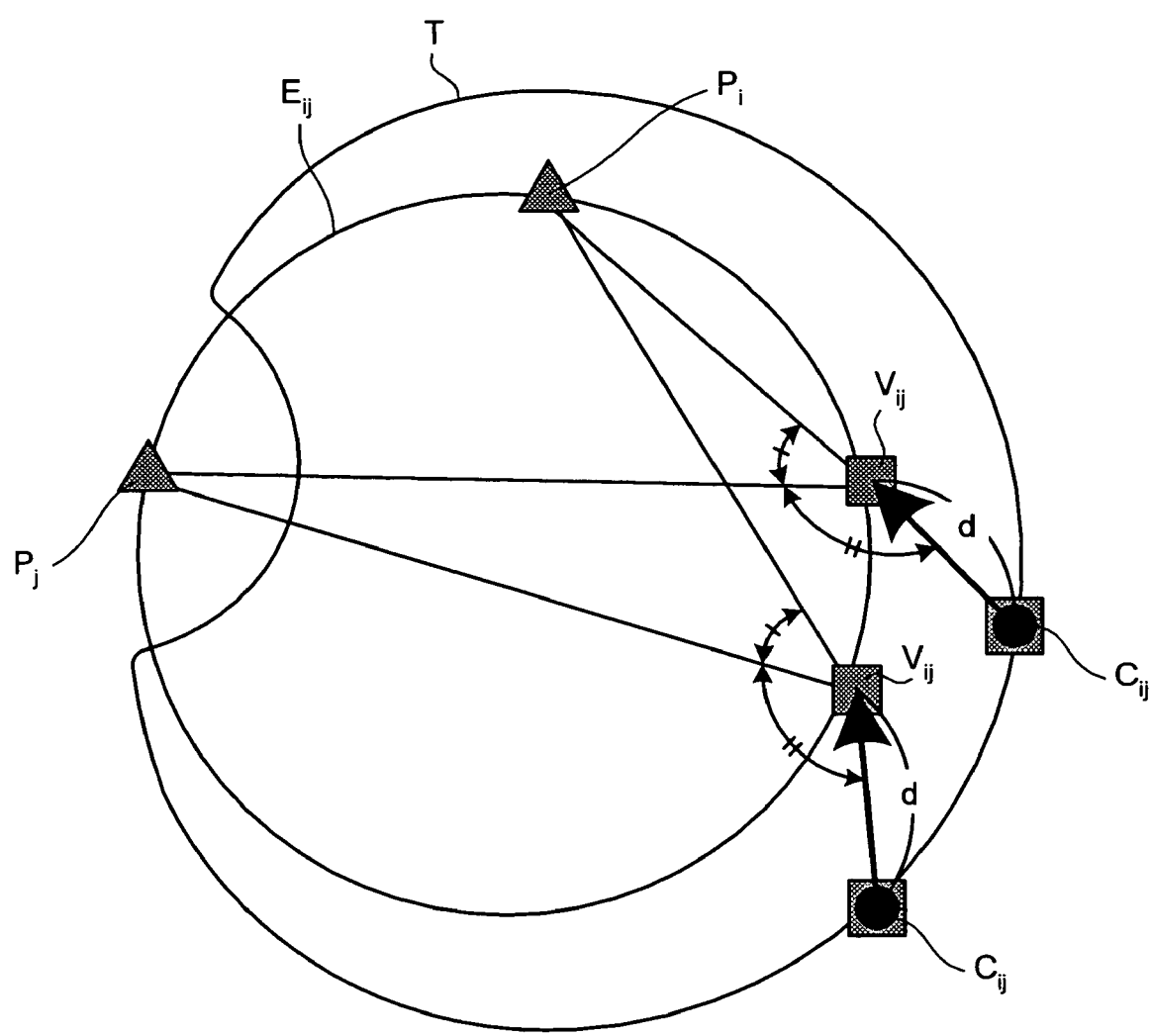

FIG. 2B is a diagram showing the moving object origin trajectory T that satisfies the described conditions 1 to 3. In case that there is a plurality of moving object origin trajectories T (for example, in case that more than 3 marker points $P_1$, $P_2$, $P_3$, . . . were observed), the position of moving object M can be identified by calculating an intersecting point coordinate of each moving object origin trajectory T. The intersecting point coordinate of each moving object origin trajectory T can be calculated by a numerical solution method such as a successive approximation method.

Figure 3:
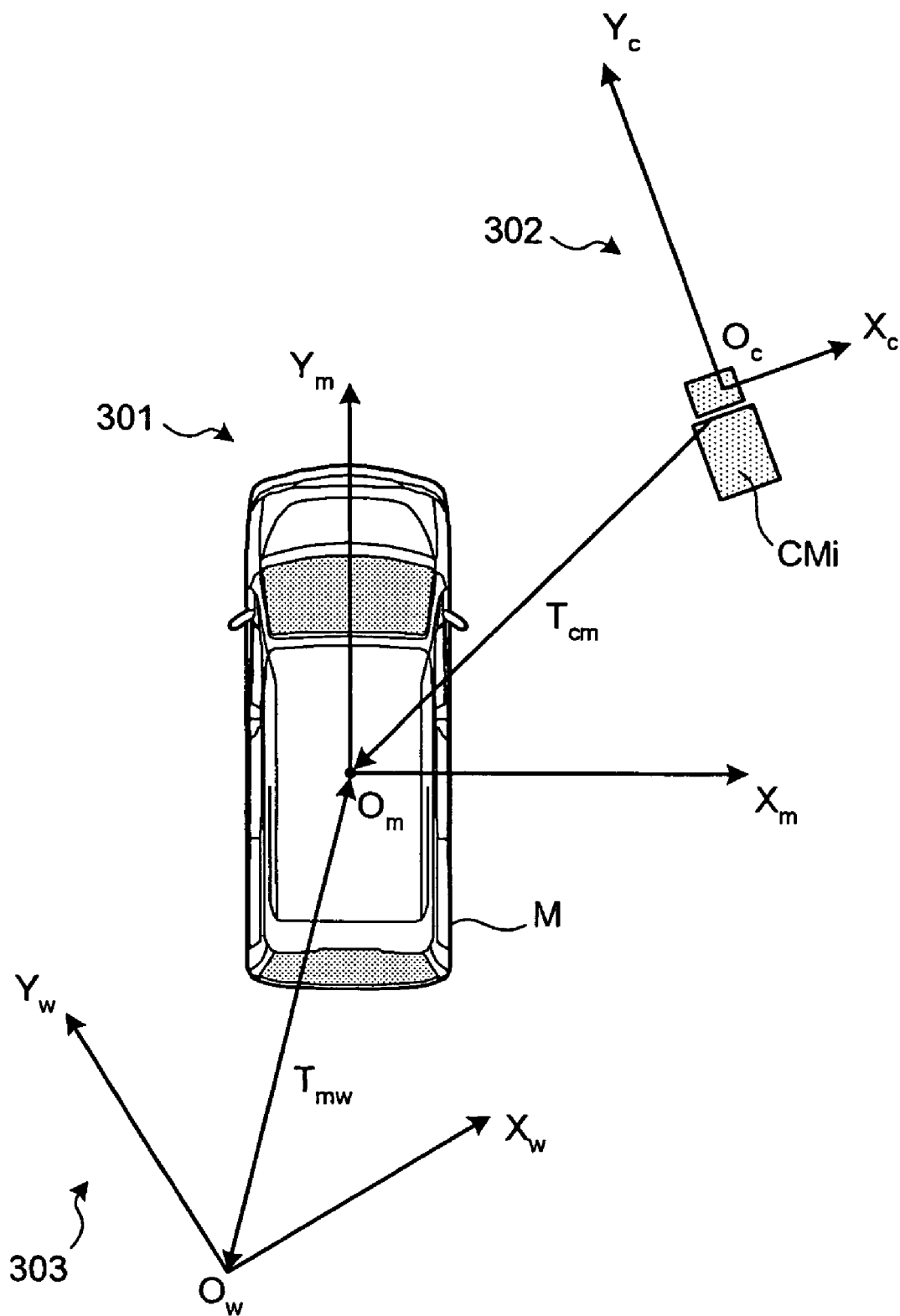
FIG. 3 is a diagram showing various coordinate systems according to an embodiment of this invention.

FIG. 3 is a diagram showing the coordinate systems according to an embodiment of this invention. In FIG. 3, a moving object coordinate system 301 is a coordinate system that expresses a plane that is parallel to the plane in which the moving object M is traveling (hereinafter, such an orientation is described as "horizontal") and is defined by a Y-axis corresponding to direction travel by the moving object M and an X-axis that is perpendicular to the Y-axis.

A camera coordinate system 302 is a coordinate system that assumes a camera origin $O_c$ to be the optical center of each camera CMi and expresses a horizontal plane and is defined by a $Y_{ci}$-axis corresponding to an optical axis of camera CMi and an $X_{ci}$-axis that is perpendicular to $Y_{ci}$-axis. The camera coordinate system 302 exists for each camera CMi. A global coordinate system 303 is a coordinate system that expresses a horizontal plane and is defined by a $Y_w$-axis corresponding to a north/south direction and an $X_w$-axis corresponding to an east/west direction, assuming an origin $O_w$ to be a predetermined reference point. A Z-axis (not shown in FIG. 3) corresponding to a vertical direction in each coordinate system is an axis that passes vertically through the horizontal plane. It is assumed that there is no change of scale among coordinate systems 301 to 303 and conversion of coordinate system is made possible by executing rotational and parallel movement around the Z-axis. Reference characters $T_{cm}$ and $T_{mw}$ in FIG. 3 indicate a traveling distance between coordinates.

Figure 4:
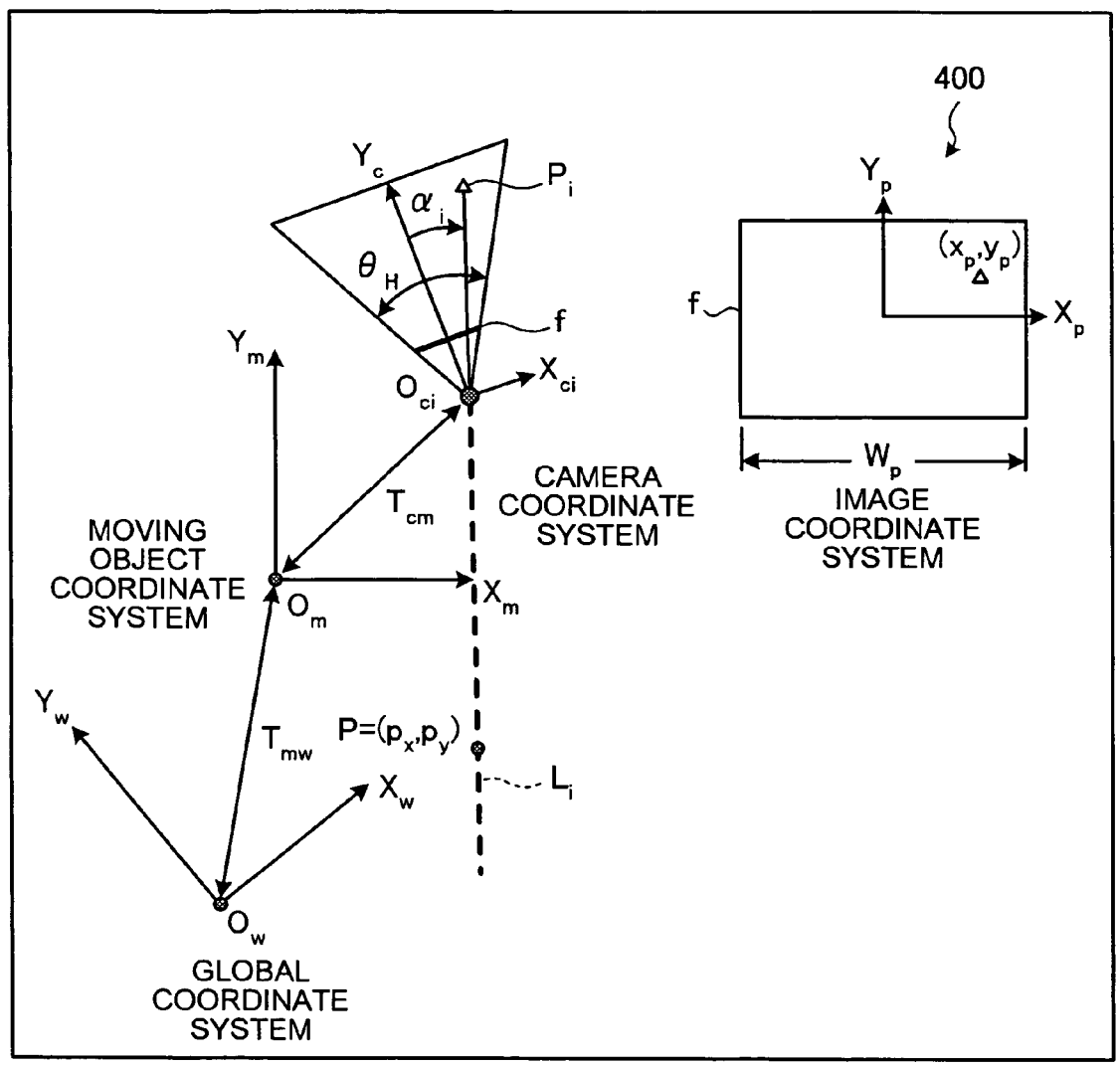
FIG. 4 is a diagram showing how an azimuthal angle of a marker is estimated upon a marker being photographed by an arbitrary camera.

FIG. 4 is a diagram showing how marker direction is estimated upon a certain marker $P_i$ being photographed by an arbitrary camera CMi. Assuming that the marker $P_i$ was photographed at a position $(x_p, y_p)$ in an image coordinate system 400 ($X_p$-$Y_p$) photographed by the camera CMi, the marker $P_i$ exists in a direction that was rotated by an angle $\alpha$ from an optical axis direction ($Y_c$-axis) in the camera coordinate system 302. At this time, $\alpha$ is expressed by equation 2.

$$\alpha = \arctan \frac{2x_p \tan \frac{\Theta_H}{2}}{W_p} \quad (2)$$

Where, $\Theta_H$ is a horizontal image angle of camera CMi and $W_p$ is a width of an image. When conversion from the camera coordinate system 302 to the moving object coordinate system 301 is executed by horizontal movement of $(t_x, t_y)$ and rotational movement by an angle $\beta$, the camera origin (optical center) $O_{ci}$ of the camera CMi and a straight line $L_i$ (marker line) passing through the marker $P_i$ are expressed by equation 3.

$$\frac{x - t_x}{-\sin(\beta - \alpha)} = \frac{y - t_y}{\cos(\beta - \alpha)} \quad (3)$$

Similarly, for the other camera and marker, its camera origin (optical center) and straight line (marker line) passing through the marker can also be calculated by equation 3.

Figure 5:
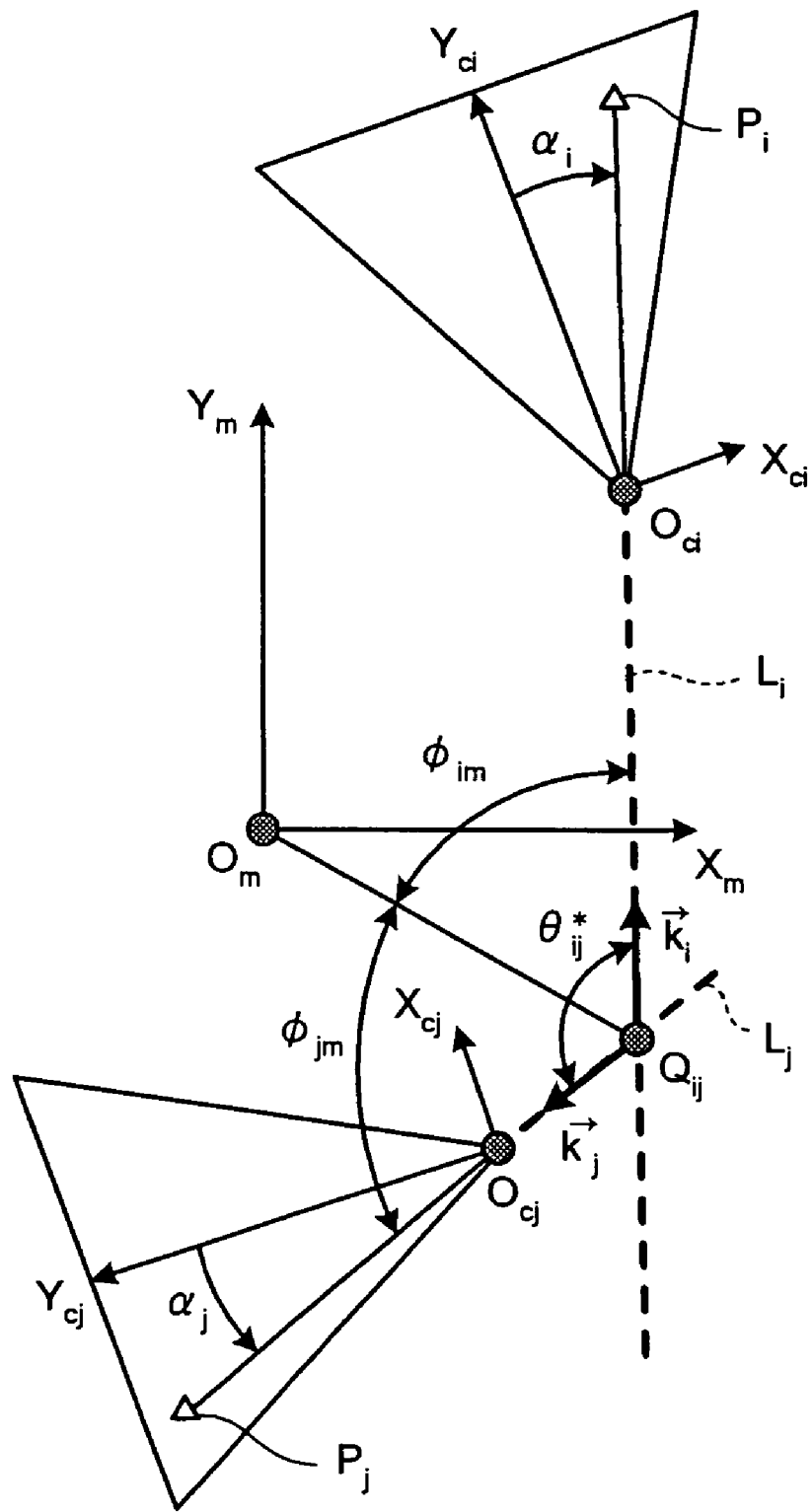
FIG. 5 is a diagram showing how an inter-marker angle is estimated.

FIG. 5 is a diagram showing how the inter-marker angle is estimated. As shown in FIG. 5, the inter-marker angle $\theta_{ij}$ is estimated by using the marker lines $L_i$ and $L_j$ obtained from a plurality of cameras (CMi, CMj). More concretely, the intersecting point of each marker line $L_i$ and $L_j$ is first calculated, then the angle (inter-marker angle $\theta_{ij}$) formed by $P_i$ and $P_j$ taking this intersecting point as a reference is calculated. In case that two arbitrary markers $P_i$ and $P_j$ were photographed by the same camera CMi, the intersecting point of marker lines $L_i$ and $L_j$ coincides with the camera origin (optical center) $O_{ci}$ of the camera CMi.

In case that $P_i$ and $P_j$ were photographed by different cameras CMi and CMj, point $Q_{ij}$ becomes an intersecting point. The intersecting point $Q_{ij}$ is called "virtual optical center $Q_{ij}$". This virtual optical center $Q_{ij}$ is expressed by equations 4.1 to 4.5.

$$Q_{ij} = \left( \frac{A_j B_i t_{ix} - A_i B_j t_{jx} + A_i A_j (t_{jy} - t_{iy})}{A_j B_i - A_i B_j}, \right. \quad (4.1)$$
$$\left. \frac{A_j B_i t_{jy} - A_i B_j t_{iy} + B_i B_j (t_{ix} - t_{jx})}{A_j B_i - A_i B_j} \right)$$

$$A_i = -\sin(\beta_i - \alpha_i) \quad (4.2)$$

$$B_i = \cos(\beta_i - \alpha_i) \quad (4.3)$$

-continued $$A_j = -\sin(\beta_j - \alpha_j) \quad (4.4)$$

$$B_j = \cos(\beta_j - \alpha_j) \quad (4.5)$$

The inter-marker angle $\theta_{ij}^*$ of two markers $P_i$ and $P_j$ as viewed from the virtual optical center $Q_{ij}$ is expressed by equation 5.

$$\theta_{ij}^* = \alpha_i - \beta_i - \alpha_j + \beta_j \quad (5)$$

An angle $\phi_{im}$ formed by one marker $P_i$ as viewed from the virtual optical center $Q_{ij}$ and the moving object origin $O_m$ is expressed by equations 6.1 to 6.3, and an angle $\phi_{jm}$ formed by another marker $P_j$ as viewed from the virtual optical center $Q_{ij}$ and the moving object origin $O_m$ is expressed by equations 6.2, 6.4, and 6.5.

$$\phi_{im} = \arcsin|\vec{k_i} \times \vec{v_{ij}}| \quad (6.1)$$

$$v_{ij} = \frac{-Q_{ij}}{|Q_{ij}|} \quad (6.2)$$

$$\vec{k_i} = (-\sin(\beta_i - \alpha_i), \cos(\beta_i - \alpha_i)) = (A_i, B_i) \quad (6.3)$$

$$\phi_{jm} = \arcsin|\vec{k_j} \times \vec{v_{ij}}| \quad (6.4)$$

$$\vec{k_j} = (-\sin(\beta_j - \alpha_j), \cos(\beta_j - \alpha_j)) = (A_j, B_j) \quad (6.5)$$

where, $k_i$ is a unit line indicating direction from the virtual optical center $Q_{ij}$ to marker $P_i$, and $k_j$ is a unit line indicating direction from the virtual optical center $Q_{ij}$ to marker $P_j$.

As shown in FIG. 5, a camera origin Ocj is an origin (optical center) of the camera CMj, the Yci-axis is a coordinate axis of camera coordinate system corresponding to optical axis direction of the camera CMj, the Xcj-axis is a coordinate axis of camera coordinate system of the camera CMj expressing a horizontal plane by perpendicularly crossing the Ycj-axis.

Figure 6:
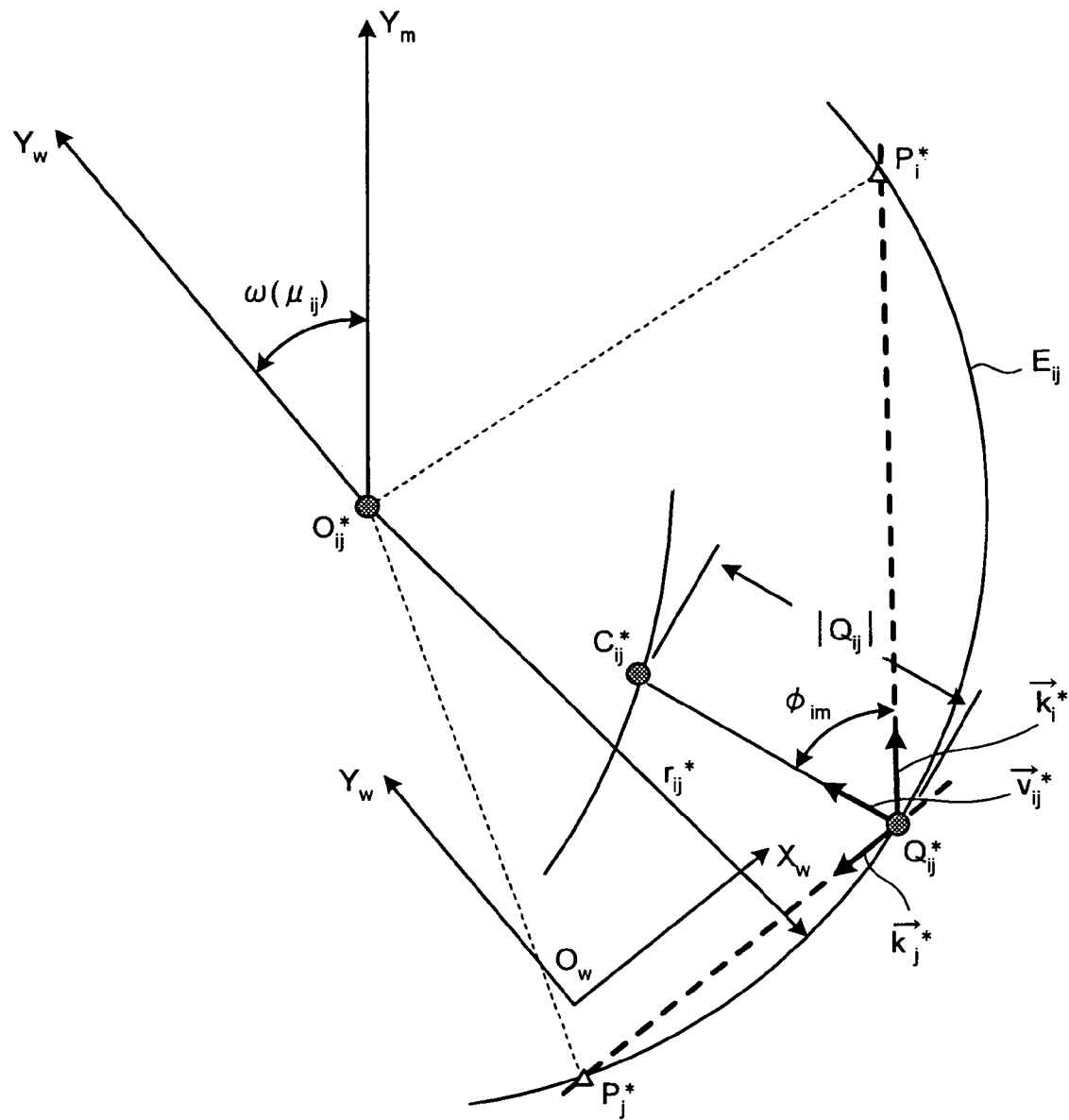
FIG. 6 is a diagram showing how a moving object origin from an inter-marker angle in global coordinate system is estimated.

FIG. 6 is a diagram showing how the moving object origin Om is estimated in the global coordinate system 303 from the inter-marker angle $\theta_{ij}^*$. Hereafter, each symbol having a "*" mark means that it is a value (coordinate position or degree) in the global coordinate system. For example, marker $P_i^*$ indicates that this is a coordinate position of the marker $P_i$ in the global coordinate system 303. As shown in FIG. 6, the position of the virtual optical center $Q_{ij}$ estimated from the inter-marker degree $\theta_{ij}^*$ in the global coordinate system 303 is given by a point $Q_{ij}^*$ on a circle having the center position $O_{ij}^*$ and the radius $r_{ij}^*$. The center position $Q_{ij}^*$ and the radius $r_{ij}^*$ are expressed by equations 7.1 and 7.2.

$$O_{ij}^* = \left(\frac{p_{ix}^* + p_{jx}^*}{2}, \frac{p_{iy}^* + p_{jy}^*}{2}\right) - \frac{1}{\tan\theta_{ij}^*}\left(\frac{p_{jy}^* - p_{iy}^*}{2}, \frac{p_{jx}^* - p_{ix}^*}{2}\right) \quad (7.1)$$

$$r_{ij}^* = \frac{1}{2\sin\theta_{ij}^*}\sqrt{(p_{jx}^* - p_{ix}^*)^2 + (p_{jy}^* - p_{iy}^*)^2} \quad (7.2)$$

Where, $P_i^* = (p_{ix}^*, p_{iy}^*)$, $P_j^* = (p_{jx}^*, p_{jy}^*)$ are coordinates of marker positions in the global coordinate system 303.

Since t distance $|Q_{ij}|$ between the moving object origin $O_m$ and the virtual optical center $O_{ij}^*$, and the angle $\theta_{im}$ formed by moving object origin $O_m$ and the marker $P_i$ are common in both the moving object coordinate system 301 and the global coordinate system 303, the position $C_{ij}^*$ of the moving object M satisfies equation 8.

$$C_{ij}^* = Q_{ij}^* + \frac{|Q_{ij}|}{|P_i^* - Q_{ij}^*|}\begin{bmatrix}\cos\phi_{im} & -\sin\phi_{im} \\ \sin\phi_{im} & \cos\phi_{im}\end{bmatrix}(P_i^* - Q_{ij}^*) \quad (8)$$

Where, the position $C_{ij}^*$ of the moving object M is merely known to exist on a circle expressed by equations 7.1 and 7.2, and therefore can not be determined by only equation 8. If the virtual optical center $Q_{ij}^*$ is expressed using a variable $\mu_{ij}$ in a polar coordinate system, it can be re-written as equation 9.

$$Q_{ij}^*(\mu_{ij}) = O_{ij}^* + r_{ij}^*(\cos\mu_{ij}, \sin\mu_{ij}) \quad (9)$$

The position $C_{ij}^*$ of the moving object M is expressed as a function of the variable $\mu_{ij}$ by equation 10.

$$C_{ij}^*(\mu_{ij}) = Q_{ij}^*(\mu_{ij}) + \frac{|Q_{ij}|}{|P_i^* - Q_{ij}^*(\mu_{ij})|}\begin{bmatrix}\cos\phi_{im} & -\sin\phi_{im} \\ \sin\phi_{im} & \cos\phi_{im}\end{bmatrix}(P_i^* - Q_{ij}^*(\mu_{ij})) \quad (10)$$

Where, the position $C_{ij}^*$ can be calculated for an arbitrary pair of markers $P_i$ and $P_j$. For example, if the position $C_{jk}^*$ is calculated for another pair of markers $P_j$ and $P_k$ by equation 10, the position $C_{jk}^*$ is identical to the position $C_{ij}^*$. Therefore, by calculating the variables $\mu_{ij}$ and $\mu_{jk}$ that make a value of $F(\mu_{ij}, \mu_{jk})$ equal to 0 in equation 11, and by substituting the variables $\mu_{ij}$ and $\mu_{jk}$ into equation 10, it is possible to determine the moving object position $C_{ij}^*$ in the global coordinate system 303.

$$F(\mu_{ij}, \mu_{jk}) = |C_{ij}^*(\mu_{ij}) - C_{jk}^*(\mu_{jk})| \quad (11)$$

It is also possible to determine the azimuthal angle $\omega(\mu_{ij})$ with which the direction of the Ym-axis of the moving object coordinate system 301 indicates the direction of moving object M by equations 12.1 and 12.2.

$$\omega(\mu_{ij}) = \arcsin|\vec{k_i} \times \vec{k_i^*}| \quad (12.1)$$

$$\vec{k_i^*} = \frac{P_i^* - Q_{ij}^*(\mu_{ij})}{|P_i^* - Q_{ij}^*(\mu_{ij})|} \quad (12.2)$$

It is also possible to calculate the variables $\mu_{ij}$ and $\mu_{jk}$ by using an analytical method or by using a numerical analysis method. When using a numerical analysis method, although the result depends on an initial value, it is possible to obtain a good initial value by using a previous position as an initial value for the moving object position in the case of continuous measurement or by using a value that was obtained from another moving object locating system. In case of the latter method, accuracy of other moving object locating system may be relatively low. For example, moving object locating systems such as a conventional GPS or an electronic compass may also be utilized.

Figure 7:
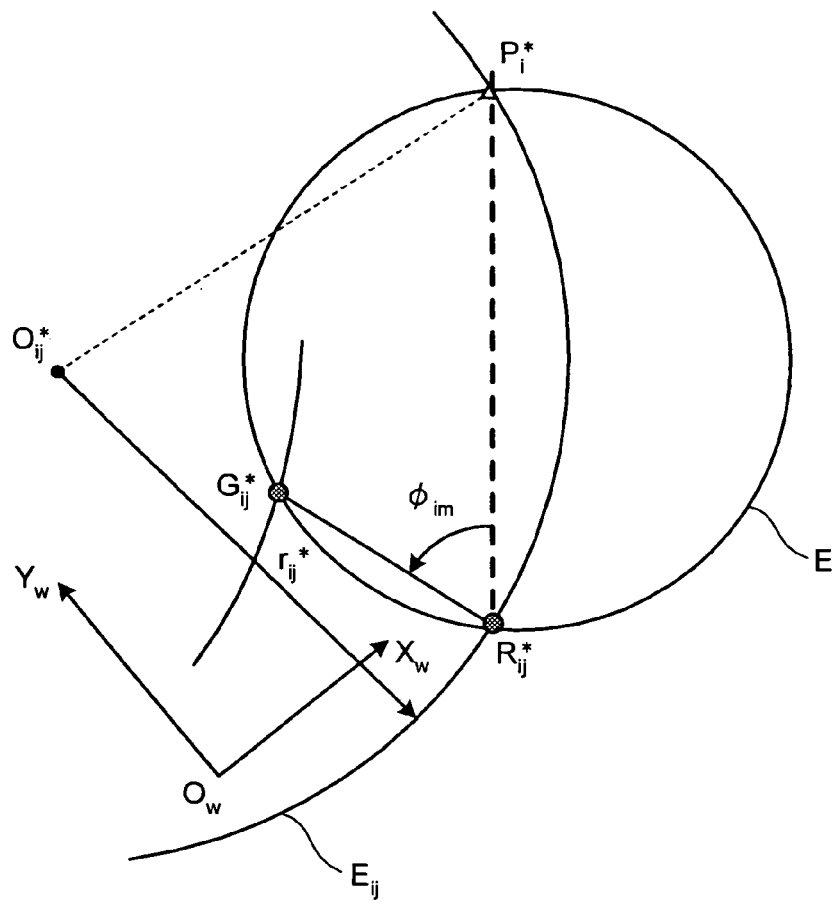
FIG. 7 is a diagram showing a method to calculate an initial value of a variable from a measured GPS value.

Here, a calculation method for the initial value of variable $\mu_{ij}$ from a measured GPS value is explained. FIG. 7 is a diagram showing the calculation method of initial value of variable $\mu_{ij}$ from the measured GPS value. As shown in FIG. 7, a position that was obtained by converting the latitude and longitude measured by GPS to the ones in the global coordinate system 303 (orthogonal coordinate system) is indicated as $G_{ij}^* = (g_{ijx}, g_{ijy})$ and the virtual optical center coordinate is indicated by $R_{ij}^*$.

At this time, although the coordinate value of $R_{ij}*$ is not known, it is known that its position is on a circle $E_{ij}$ that is expressed by a center position $O_{ij}*$ and radius $r_{ij}*$ obtained from equations 7.1 and 7.2. Assuming that an angle formed by two lines directed from the marker $P_i*$ to the virtual optical center coordinate and a line directed from $R_{ij}*$ to the latitude/longitude coordinate $G_{ij}*$ can be approximated by the angle $\phi_{im}$ (refer to equations 6.1 to 6.3), the virtual optical center coordinate $R_{ij}*$ exists on the circle E expressed by equations 13.1 and 13.2.

$$\sum_{ij} = \left(\frac{p_{ix}+g_{ijx}}{2}, \frac{p_{iy}+g_{ijy}}{2}\right) - \frac{1}{\tan\phi_{im}}\left(\frac{g_{ijy}-p_{iy}}{2}, \frac{g_{ijx}-p_{ix}}{2}\right) \quad (13.1)$$

$$\sigma_{ij} = \frac{1}{2\sin\phi_{im}}\sqrt{(g_{ijx}-P_{ix})^2+(g_{ijy}-p_{iy})^2} \quad (13.2)$$

Thus, the virtual optical center coordinate $R_{ij}*$ can be obtained by calculating the intersecting point of the circle E and the circle $E_{ij}$. The virtual optical center coordinate $R_{ij}*$ can be expressed by equation 14.

$$R*_{ij}=O*_{ij}+r*_{ij}(\cos\lambda_{ij}, \sin\lambda_{ij}) \quad (14)$$

In equation 14, a value that best satisfies the variable $\lambda_{ij}$ can be determined as an initial value of the variable $\mu_{ij}$.

Figure 8:
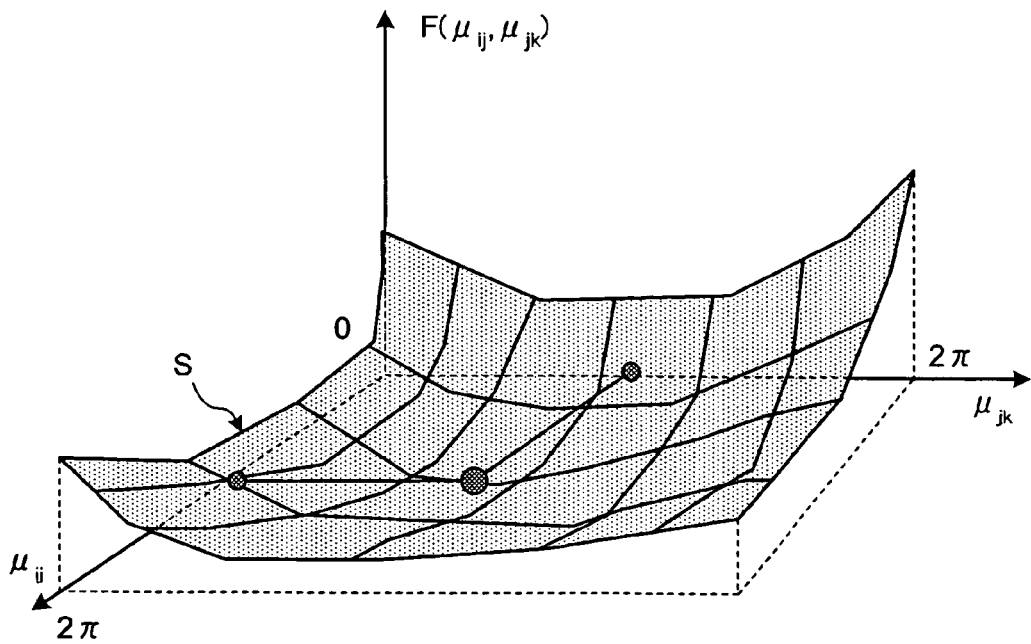
FIG. 8 is a diagram showing a solution space of an evaluation function.

Next, the numerical analysis method for variable $\mu_{ij}$ and $\mu_{jk}$ is described concretely. FIG. 8 is a showing a curved surface as a solution space of the evaluation function $F(\mu_{ij}, \mu_{jk})$ expressed by equation 11. Both of the variables $\mu_{ij}$ and $\mu_{jk}$ have a definition region of [0, 2π] and $F(\mu_{ij}, \mu_{jk})$ has a unique value equal to or greater than 0 for each variable $\mu_{ij}$ and $\mu_{jk}$. By obtaining the values ($\mu_{ij}, \mu_{jk}$) that make $F(\mu_{ij}, \mu_{jk})$ equal to 0 on this curved surface S, it is possible to identify the moving object coordinate origin $O_m$.

The values ($\mu_{ij}, \mu_{jk}$) that make $F(\mu_{ij}, \mu_{jk})$ equal to 0 can be obtained by using a numerical analysis method. Assuming that an arbitrary position ($\lambda_{ij}, \lambda_{jk}$) is an initial value of ($\mu_{ij}, \mu_{jk}$), a position where F becomes 0 (or minimum value) when moving the position ($\lambda_{ij}, \lambda_{jk}$) in direction in which the value decreases in the solution space of $F(\mu_{ij}, \mu_{jk})$ is a desirable value for ($\lambda_{ij}, \mu_{jk}$).

However, since the curved surface of $F(\mu_{ij}, \mu_{jk})$ is not necessarily decreasing monotonically and the solution does not necessarily converge to a correct solution, how the initial value is selected is important. Hence, conversion to an incorrect solution is avoided either by using the ($\mu_{ij}, \mu_{jk}$) value of a previous moving object-locating or by using the initial value of the variable ij obtained from a rough position calculation result by the GPS.

Figure 9:
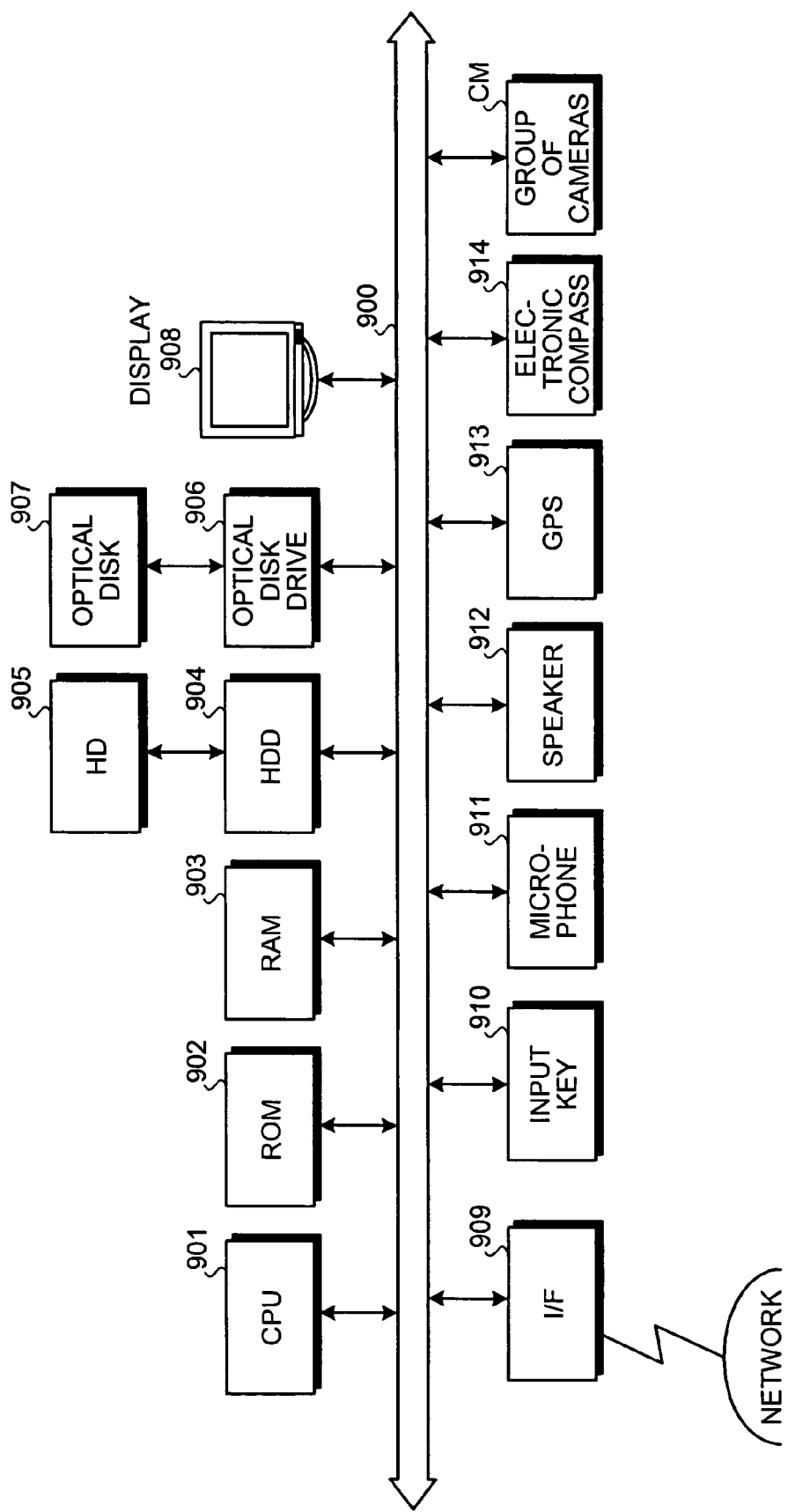
FIG. 9 is a block diagram showing a moving object locating system according to an embodiment of this invention.

FIG. 9 is a diagram showing a configuration of a moving object locating system according to an embodiment of this invention. As shown in FIG. 9, the moving object locating system includes a central processing unit (CPU) 901, a read-only memory (ROM) 902, a random access memory (RAM) 903, a hard disk drive (HDD) 904, a hard disk (HD) 905, an optical disk drive 906, an optical disk 907 as an example of a removable recording medium, a display 908, an interface (I/F) 909, an input key 910, a microphone 911, a speaker 912, a GPS 913, an electronic compass 914, and a plurality of cameras CM. Each component is connected by a bus 900.

The CPU 901 governs operation control of the entire moving object locating system. The ROM 902 stores a program such as a boot up program. The RAM 903 is used as a work area of the CPU 901. The HDD 904 controls reading/writing of data in the HD 905 under the control of the CPU 901. The HD 905 stores data written under the control of the HDD 904.

The optical disk drive 906 controls reading/writing of the optical disk 907 under the control of the CPU 901. The optical disk 907 stores data written under the control of the optical disk drive 906 and allows the moving object locating system to read the stored data in the optical disk 907.

The display 908 displays data such as a document, an image, function information, as well as a cursor, an icon, toolbox, etc. For the display 908, a cathode ray tube (CRT), thin film transistor (TFT) liquid crystal display, plasma display, etc. for example, may be adopted.

The I/F 909 is connected to a network such as the internet through a communication line, and is also connected to external equipment via the network. Furthermore, the I/F 909 acts as an interface between the network and the internal moving object locating system and controls input/output of data from/to external equipment. For the I/F 909, a modem, a local area network (LAN) adapter, etc. for example, may be adopted.

The input key 910 is a set of buttons for inputting characters, numerical values, or various commands and serves as a data entry device. It may be a touch-panel. The microphone 911 receives an audio signal from an external source and converts it to a digital signal. The speaker 912 outputs sound according to the audio signal converted from the digital signal.

The GPS 913 includes an antenna for receiving an electromagnetic wave from a GPS satellite, a tuner for demodulating the received signal, and a logic circuit for calculating a current position according to the demodulated information. Furthermore, the current position of the moving object M can be determined by receiving an electromagnetic wave from the GPS satellite and calculating a geometrical position against the GPS satellite. The electronic compass 914 is an integrated circuit (IC) for calculating the direction of the moving object and includes an earth magnetism sensor. It detects the earth magnetism from north to south generated by the earth using the earth magnetism sensor and calculates the azimuthal angle to the moving object. The plurality of cameras CM is an aggregate of multiple cameras CM1 to $CM_n$ looked at through by the moving object M.

Figure 10:
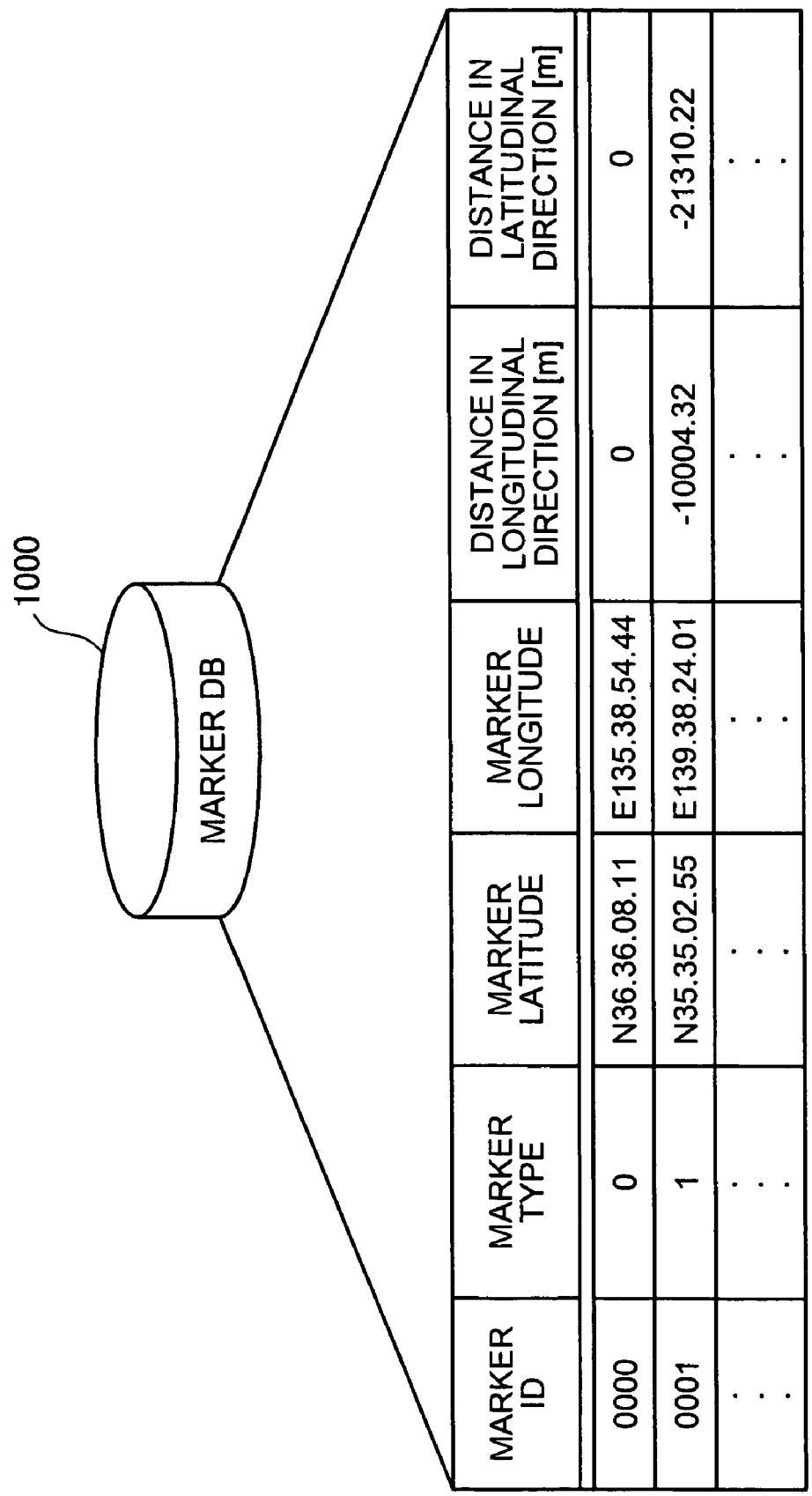
FIG. 10 is a diagram showing content of marker DB.

FIG. 10 is a diagram showing content stored in a marker database DB 1000. As shown in FIG. 10, the marker DB 1000 stores the marker data for each marker $P_i$ including a marker ID, a marker type, a marker latitude, a marker longitude, a latitudinal distance, and a longitudinal distance.

The marker type is information to identify the type of the marker $P_i$. For example, "0" is defined as a reference point, "1" is defined as a traffic signal, "2" is defined as a road traffic sign, "3" is defined as a utility pole, etc. The marker latitude means the latitude of the marker $P_i$, and the marker longitude means the longitude of the marker $P_i$.

Longitudinal distance means the distance in the longitudinal direction of $P_i$ from the reference point, and latitudinal distance means the distance in the latitudinal direction of $P_i$ from the reference point. Specifically, the marker DB 1000 realizes its function by recording media such as the ROM 902, the RAM 903, the HD 905, and the optical disk 907, for example, shown in FIG. 9.

Figure 11:
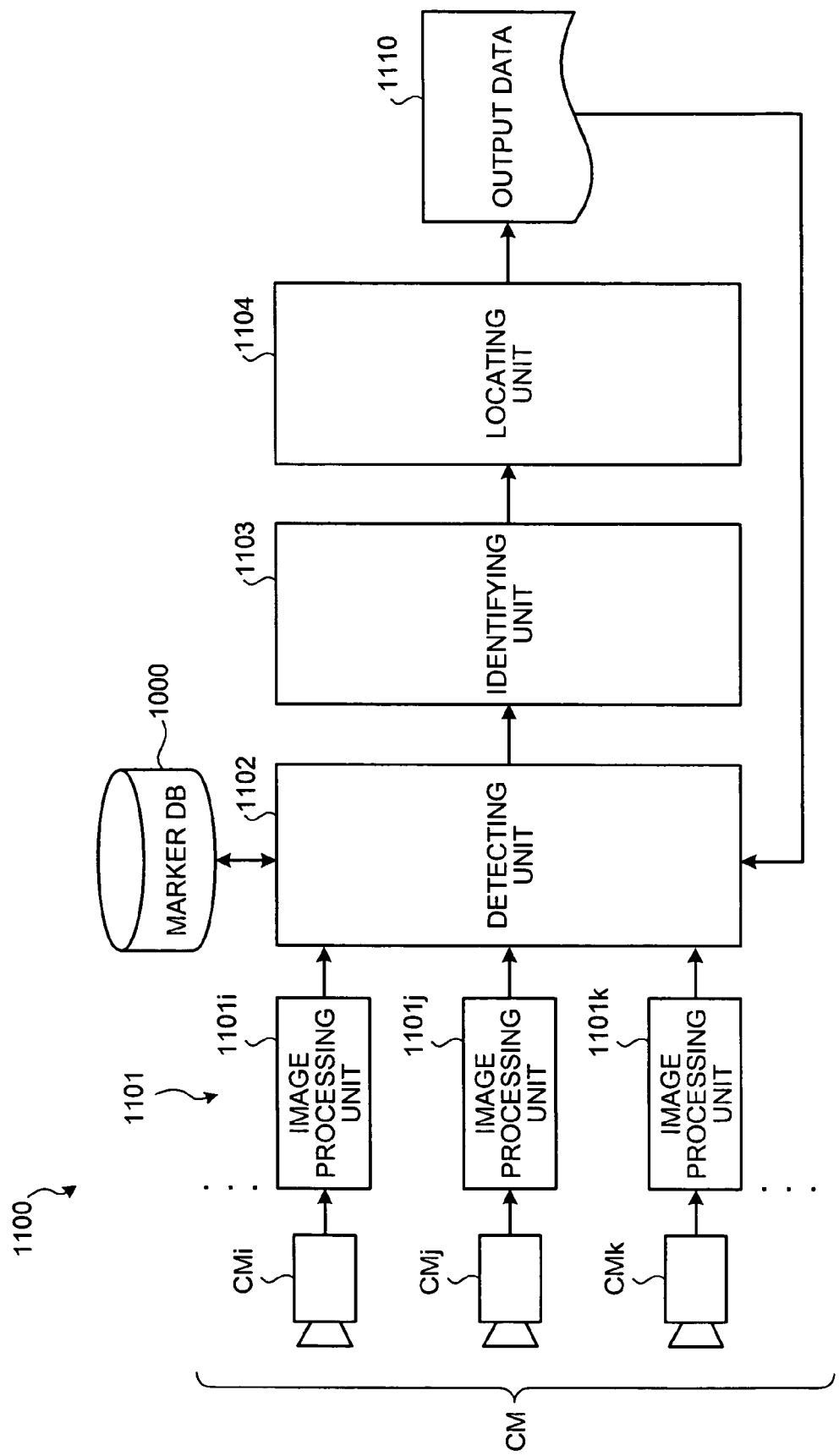
FIG. 11 is a block diagram showing a moving object locating system according to an embodiment of this invention.

FIG. 11 is a block diagram of the moving object locating system according to an embodiment. As shown in FIG. 11, a moving object locating system 1100 includes the marker DB 1000, the plurality of cameras CM ( . . . , CMi, CMj, CMk, . . . ), an image processing unit 1101 ( . . . , 1101i, 1101j, 1101k, . . . ), a detecting unit 1102, an identifying unit 1103 and a locating unit 1104.

Each camera CMi, CMj, and CMk are set so as to photograph the horizontal road environment from the moving object M. The installation position coordinates $(t_{ix}, t_{iy})(t_{jx}, t_{jy})$ and $(t_{kx}, t_{ky})$ of each camera CMi, CMj, and CMk in the camera coordinate system 302 and the rotation angles $\beta_i$, $\beta_j$, and $\beta_k$ that express the difference of coordinate axis from that of the moving object coordinate system 301 have already been determined. The installation position coordinates $(t_{ix}, t_{iy})(t_{jx}, t_{jy})$ and $(t_{kx}, t_{ky})$ and the rotation angles $\beta_i$, $\beta_j$, and $\beta_k$ of each camera CMi, CMj, and CMk are read into the detecting unit 1102 herein later described.

The image processing unit 1101 extracts images of the markers $P_i$, $P_j$ and $P_k$ from images photographed outside the moving object M by the plurality of cameras CM. Image extraction and recognition of the markers $P_i$, $P_j$ and $P_k$ in the photographed images may be executed by using an appropriate conventional technology. In general, upon the markers $P_i$, $P_j$ and $P_k$ being traffic signals, the markers can be extracted by identifying the color (such as red, yellow, and green) and shape (such as a circle) of a light that a traffic signal lens might emit. Although the image processing unit 1101 is built as 1 to 1 with a camera, it is also possible to take such a structure that processes the group of camera CM with a single image processing unit 1101.

The detecting unit 1102 detects position and direction of the markers $P_i$, $P_j$ and $P_k$ that are contained in each image photographed of the outside environment of the moving object M. More concretely, the detecting block calculates the horizontal image angle $\alpha_i$, $\alpha_j$ and $\alpha_k$ of markers $P_i$, $P_j$ and $P_k$ of which image was extracted by the image processing unit 1101 by using equation 2. Then, referring to the position information of the markers $P_i$, $P_j$ and $P_k$ that were stored in the marker DB 1000 of the global coordinate system 303 (for example, latitude, longitude, or orthogonal coordinate value on setting the reference point), the detecting block extracts the marker data corresponding to the observed markers $P_i$, $P_j$ and $P_k$ from the marker DB 1000.

Since it is difficult to identify the markers $P_i$, $P_j$ and $P_k$ when the position and direction of the moving object M are unknown, the detecting unit 1102 identifies the position of image processed markers in the global coordinate system 303 by estimating the longitude/latitude and the marker type of the extracted markers $P_i$, $P_j$ and $P_k$, by extracting the nearest marker data from the marker DB 1000, by using the output result of the GPS 913 as the position of the moving object M and by using the measured value of the electronic compass 914 as the direction of moving object M.

In the case that position measurement is continuously executed, it is also possible to use the previous position data of the vehicle itself measured by the moving object locating system 1100 at a previous time. In case of utilizing an assumed position and direction of vehicle itself, the detecting unit 1102 extracts the markers existing in horizontal direction angle $\alpha_i$, $\alpha_j$ and $\alpha_k$ of each camera CMi, CMj and CMk when the moving object M is arranged in its position and direction. And then, it extracts the markers $P_i$, $P_j$ and $P_k$ with the nearest distance and having the smallest angle error from the extracted markers $P_i$, $P_j$ and $P_k$ as the corresponding markers (coordinate values $P_i^*$, $P_j^*$, and $P_k^*$ in the global coordinate system 303).

Marker data $D_i=\{\alpha_i,\beta_i, (t_{ix}, t_{iy}),P_i^*\}$, $D_j=\{\alpha_j,\beta_j, (t_{jx}, t_{jy}), P_j^*\}$, $D_k=\{(\alpha_k,\beta_k, (t_{kx}, t_{ky}),P_k^*\}$ of the extracted marker $P_i^*$, $P_j^*$ and $P_k^*$ are output to the identifying unit 1103.

The identifying unit 1103 identifies the moving object origin trajectory $C_{ij}^*$ relating to an unknown origin position of the moving object M according to the markers $P_i^*$ and $P_j^*$ (marker data $D_i$, marker data $D_j$) detected by the detecting unit 1102. It also identifies the moving object origin trajectory $C_{jk}^*$ relating to an unknown origin position of the moving object according to the markers $P_j^*$ and $P_k^*$ (marker data $D_j$, marker data $D_k$). A detailed functional structure of the identifying unit 1103 is described later (refer to FIG. 12).

The locating unit 1104 locates the position of an unknown moving object origin to a coordinate of an intersecting point of trajectories of moving object origin $C_{ij}^*$ and $C_{jk}^*$ identified by the identifying unit 1103 by using equations 10 and 11. It also locates the azimuthal angle $\omega(\mu_{ij})$ of the moving object M by using equations 12.1 and 12.2. That is, the locating unit 1104 outputs the coordinate of the intersecting point of trajectories of the moving object origin $C_{ij}^*$ and $C_{jk}^*$ and the azimuthal angle $\omega(\mu_{ij})$ of the moving object M as the output data 1110.

Figure 12:
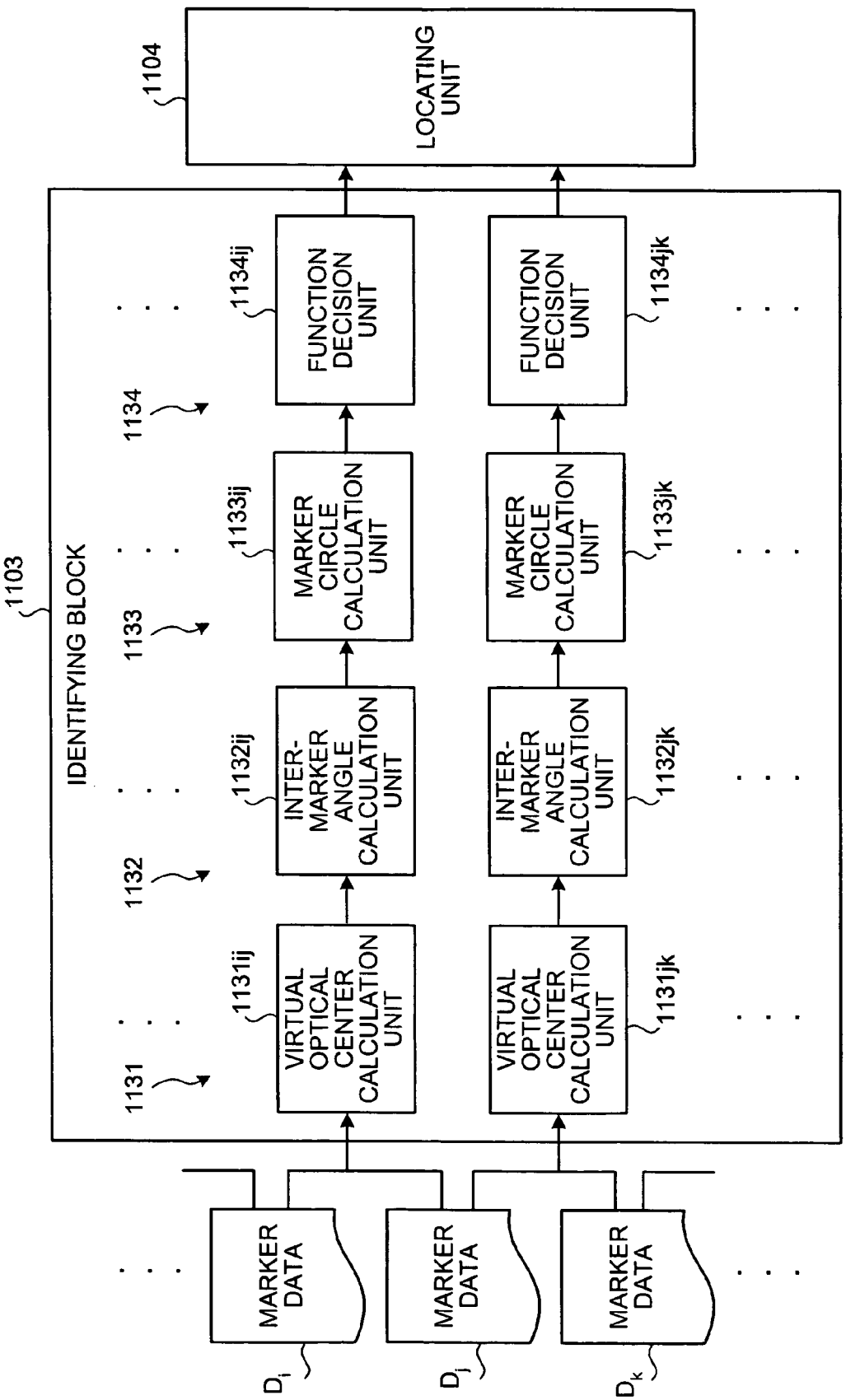
FIG. 12 is a block diagram showing an identifying unit.

Next, a functional structure of the identifying unit 1103 is described in detail. FIG. 12 is a block diagram showing the identifying unit 1103. The identifying unit 1103 includes a virtual optical center calculation unit 1131 ( ... , 1131ij, 1131j k, ... ), a inter-marker angle calculation unit 1132 ( ... , 1132ij, 1132j k, ... ), a marker circle calculation unit 1133 ( ... , 1133ij, 1133j k, ... ) and a function decision unit 1134 ( ... , 1134ij, 1134j k, ... ).

Here, a case in which the identifying block reads two marker data $D_i$ and $D_j$ is explained. As for the case that the identifying block read two marker data $D_j$ and $D_k$, a description is skipped because the same explanation can be applied by just replacing the suffix "ij" with "jk".

First, the virtual optical center calculation unit 1131ij acquires two marker data $D_i$ and $D_j$ and calculates the virtual optical center $Q_{ij}$ by using equation 4.1 to 4.2. Using equation 5, the inter-marker angle calculation unit $1132_{ij}$ calculates the inter-marker angle $\theta_{ij}^*$ of the two markers $P_i$ and $P_j$ as viewed from the virtual optical center $Q_{ij}$ that was calculated by the virtual optical center calculation unit $1131_{ij}$.

Using equations 7.1 and 7.2, the marker circle calculation unit 1133ij calculates the center position $O_{ij}^*$ and radius $r_{ij}^*$ of a marker circle $E_{ij}$ for identifying the position of the virtual optical center $O_{ij}$ estimated from the inter-marker angle $\theta_{ij}^*$ calculated by the inter-marker angle calculation unit $1132_{ij}$ in the global coordinate system 303.

Using equations 8 and 9, the function decision unit $1134_{ij}$ decides the origin trajectory function $C_{ij}^*(\mu_{ij})$ of the moving object M in the global coordinate system 303 (refer to equation 10. In this way, the function decision unit 1134 decides the origin trajectory function $C_{ij}^*(\mu_{ij})$ and $C_{jk}^*(\mu_{jk})$ for each marker pair $(P_i, P_j)$ and $(P_j, P_k)$.

In this case, the locating unit 1104 calculates $(\lambda_{ij}, \mu_{jk})$ that makes the evaluation function $F(\mu_{ij}, \mu_{jk})$ "0" or minimizes it by using the origin trajectory function $C_{ij}^*(\mu_{ij})$ calculated from one marker pair $(P_i, P_j)$ and the origin trajectory function $C_{jk}^*(\mu_{jk})$ calculated from another marker pair $(P_j, P_k)$. Then, by substituting the calculated $(\mu_{ij}, \mu_{jk})$ into equations 9 and 10, position of moving object origin can be obtained, and by substituting the calculated $(\mu_{ij}, \mu_{jk})$ into equations 11 and 12, the azimuthal angle as a direction of the moving object M can be obtained.

In order to calculate $(\mu_{ij}, \mu_{jk})$ that minimizes the evaluation function $F(\mu_{ij}, \mu_{jk})$, it is also possible to use exploratory numerical analysis method such as a steepest descent method. In this case, because whether the optimum solution can be obtained depends on what initial value is selected, the number of exploratory repletion greatly changes depending on the initial value. Therefore, it is also possible to use the values derived from the position and the azimuthal angle obtained from the GPS 913 and the electronic compass 914 as the initial value of exploring. In case that position measurement is executed continuously, it is possible to start exploration using the value derived from the position and the azimuthal angle that have already been obtained during a previous measurement or the previous value of ($\mu_{ij}$, $\mu_{jk}$) itself.

Figure 13:
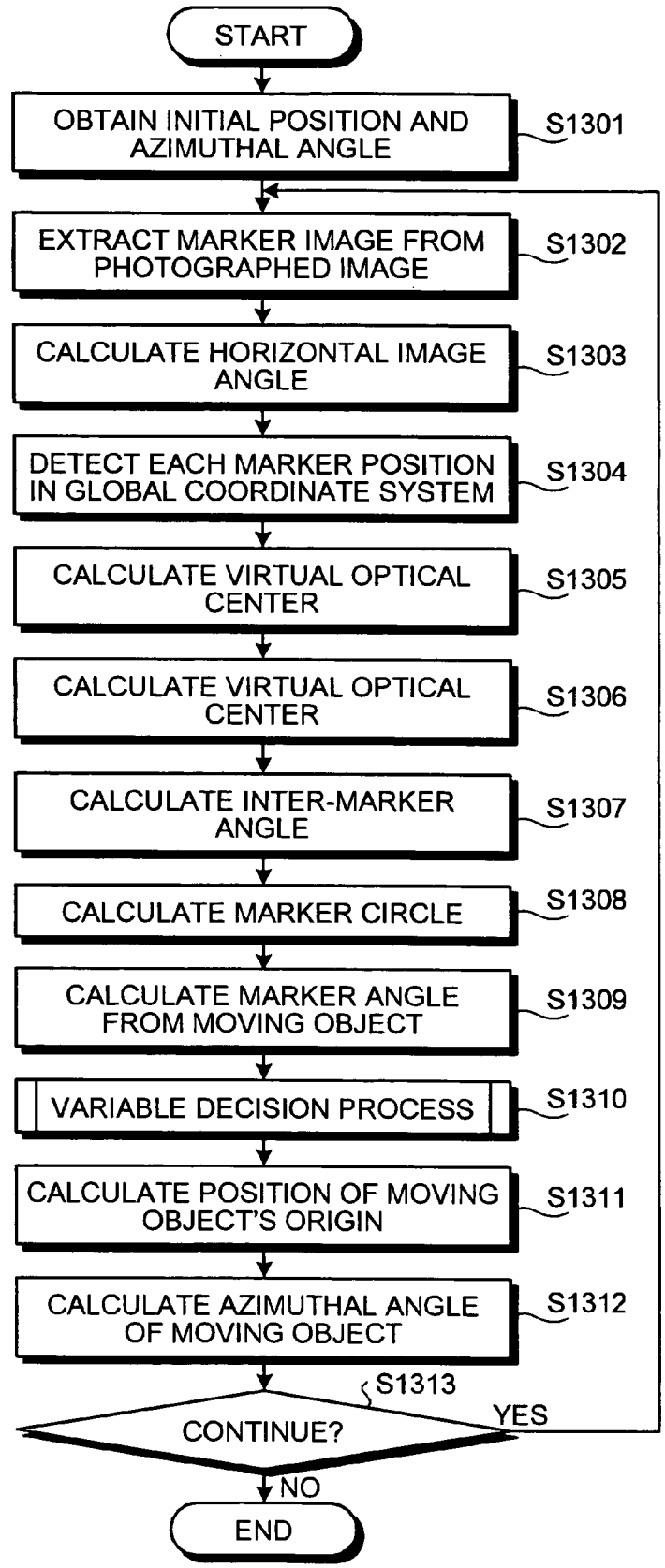
FIG. 13 is a flowchart showing a moving object-locating procedure according to an embodiment of this invention.

FIG. 13 is a flowchart showing a procedure of moving object locating system according to an embodiment of this invention. As shown in FIG. 13, the GPS 913 obtains the initial position of the moving object M and the electronic compass 914 obtains the azimuthal angle of the moving object M (step S1301).

Then, the image processing unit 1101 extracts marker images from images photographed by the camera $CM_i$ (step S1302). The detecting unit 1102 calculates the horizontal image angle $\alpha_i$ (step S1303) and detects the marker data $D_i$, $D_j$ and $D_k$ of each marker $P_i^*$, $P_j^*$ and $P_k^*$ in the global coordination system 303 (step S1304).

Next, the identifying unit 1103 first calculates the marker line $L_i$ of marker $P_i^*$ and the marker line $L_j$ of the marker $P_j^*$ by using equation 3 (step S1305), and the virtual optical center calculation unit 1131 calculates the virtual optical center $Q_{ij}$ that is an intersecting point of the marker line Li and $L_j$ by using equations 4.1 to 4.2 (step S1306).

Then, the inter-marker angle calculation unit 1132$ij$ calculates the inter-marker angle $\theta_{ij}^*$ of two markers $P_i$ and $P_j$ as viewed from the virtual optical center $Q_{ij}$ calculated by the virtual optical center calculation unit 1131 by using equation 5 (step S1307).

By using equations 7.1 and 7.2, the Marker circle calculation unit 1133$ij$ calculates the center position $O_{ij}^*$ and the radius $r_{ij}^*$ of the marker circle $E_{ij}$ to identify the position of the virtual optical center $Q_{ij}$ in the global coordinate system 303 that is estimated from the inter-marker angle $\theta_{ij}^*$ calculated by the inter-marker angle calculation unit 1132$_{ij}$ (step S1307).

The function decision unit 1134$_{ij}$ calculates the inter-marker angle $\phi_{im}$ between one marker $P_i$ and the moving object origin $O_m$ looked at from the virtual optical center $Q_{ij}$ by using equations 6.1 to 6.3, and also calculates the inter-marker angle $\phi_{jm}$ between the marker $P_j$ and the moving object origin $O_m$ looked at from the virtual optical center $Q_{ij}$ by using equations 6.2 to 6.5 (step S1309).

Where, the processes from step S1305 to step S1309 are executed similarly for the marker data $D_j$ and $D_k$ of the marker $P_j^*$ and $P_k^*$ using the inter-marker angle calculation unit 1132$_{jk}$, the marker circle calculation unit 1133$jk$ and the function decision unit 1134$jk$.

After this, the function decision unit 1134 executes the variable decision process (step S1310). That is, it decides the origin trajectory function $C_{ij}^*(\mu_{ij})$, $C_{jk}^*(\mu_{jk})$, . . . for each marker pair ($P_i$, $P_j$), ($P_j$, $P_k$), . . . by using equations 8 and 9. Then, by substituting the origin trajectory function $C_{ij}^*(\mu_{ij})$, $C_{jk}^*(\mu_{jk})$ into equation 11, the function decision unit 1134 decides the variables ($\mu_{ij}$, $\mu_{jk}$) that makes evaluation function $F(\mu_{ij}, \mu_{jk})$ "0" or minimizes it.

The locating unit 1104 calculates the moving object origin position $C_{ij}^*$ in the global coordinate system 303 by substituting ($\mu_{ij}$, $\mu_{jk}$) into equations 9 and 10 (step S1311) And the locating unit 1104 calculates also the azimuthal angle $\omega(\mu_{ij})$ as the direction of the moving object M by substituting ($\mu_{ij}$, $\mu_{jk}$) into equations 12.1 and 12.2 (step S1312).

After this, whether to continue moving object-locating is judged (step S1313). When moving object-locating is continued (step S1313: Yes), the process returns to step S1302. In this case, calculation of a new position and azimuthal angle of the moving object origin is executed by using the moving object origin position $C_{ij}^*$ and the azimuthal angle $\omega(\mu_{ij})$ calculated in Step S1311 and Step S1312. On the other hand, in case that moving object-locating is not continued (step S1313: No), the procedure of moving object-locating is completed.

Figure 14:
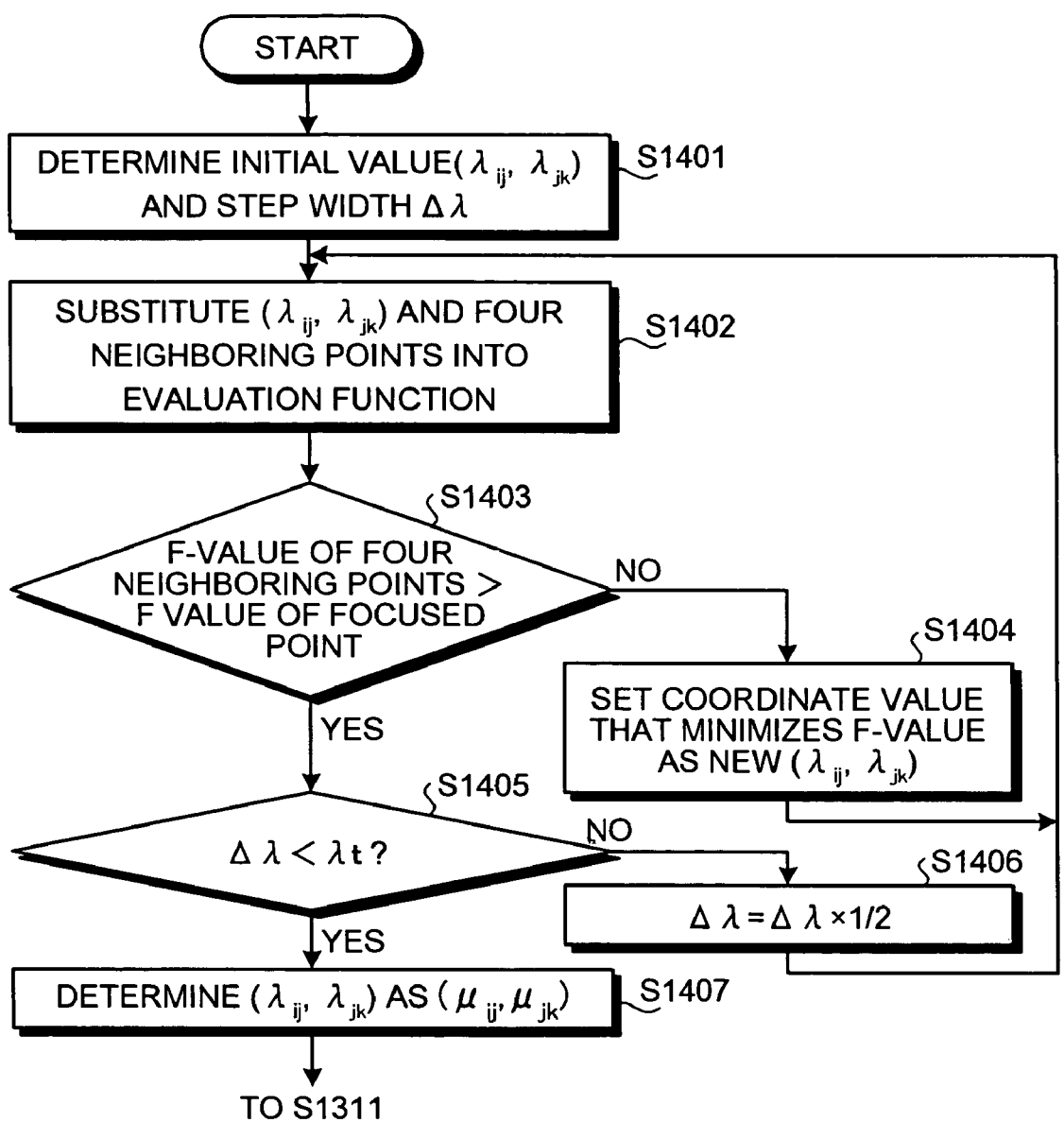
FIG. 14 is a flowchart showing a procedure of a variable decision process.

FIG. 14 is a flowchart showing a concrete procedure of variable decision process (step S1310).

First, it is assumed that an initial value of the variable ($\mu_{ij}$, $\mu_{jk}$) corresponds to a focused point ($\lambda_{ij}$, $\lambda_{jk}$) and its step width is $\Delta\lambda$ (step S1401). Then, the focused point ($\lambda_{ij}$, $\lambda_{jk}$) is substituted into the evaluation function F and, at the same time, values neighboring the focused point ($\lambda_{ij}$, $\lambda_{jk}$) (in this case, neighboring four points) are substituted into the evaluation function F (step S1402).

Figure 15:
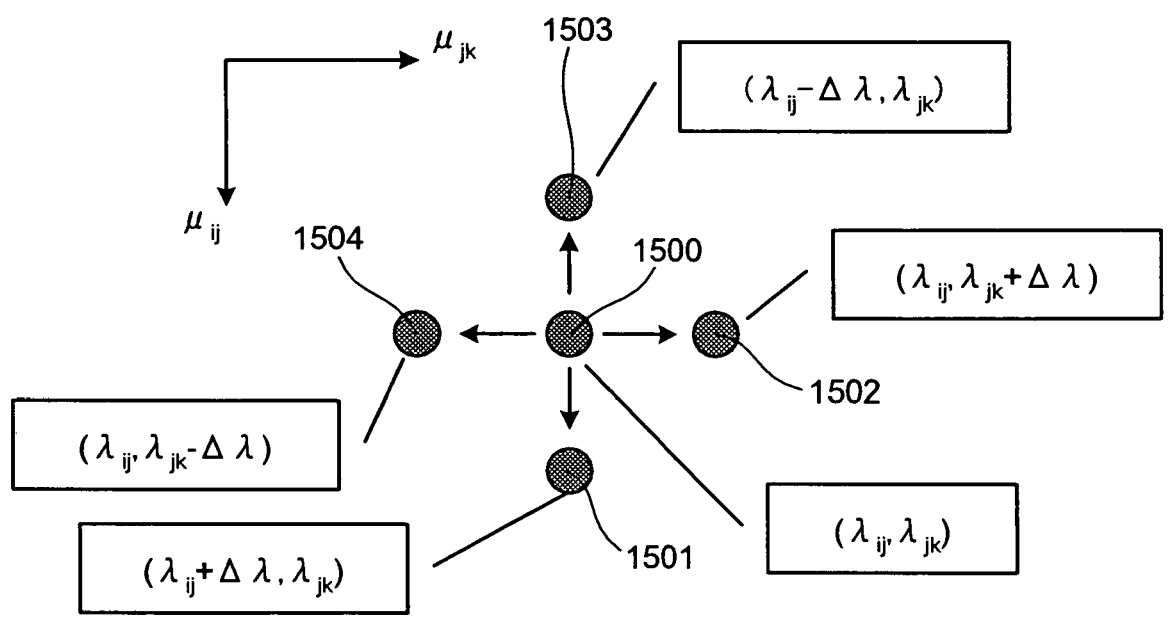
FIG. 15 is a diagram showing neighboring points around a focused point.
Figure 16:
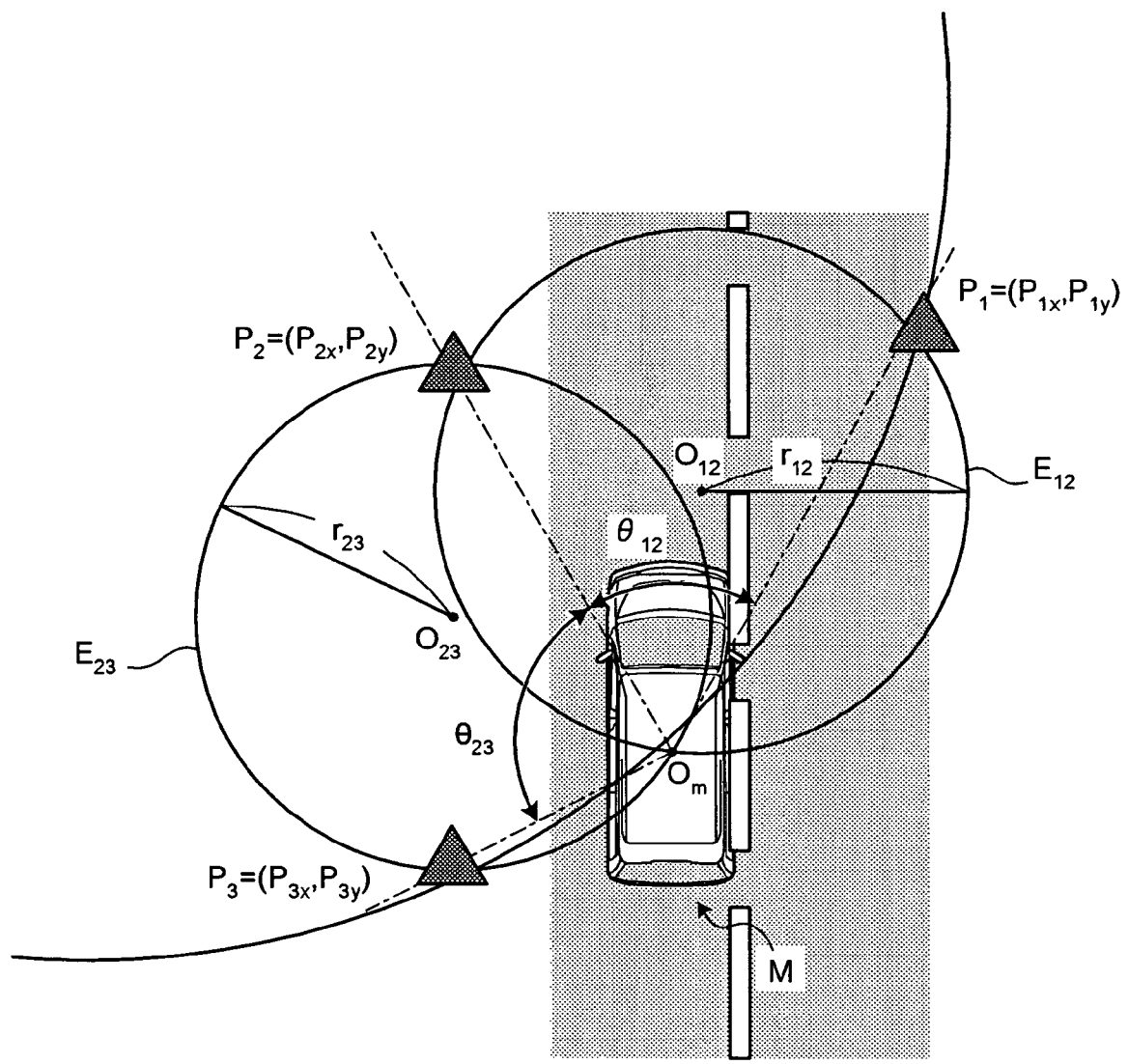
FIG. 16 is a diagram showing a locating method based on markers photographed by cameras installed on a moving object.
Figure 17:
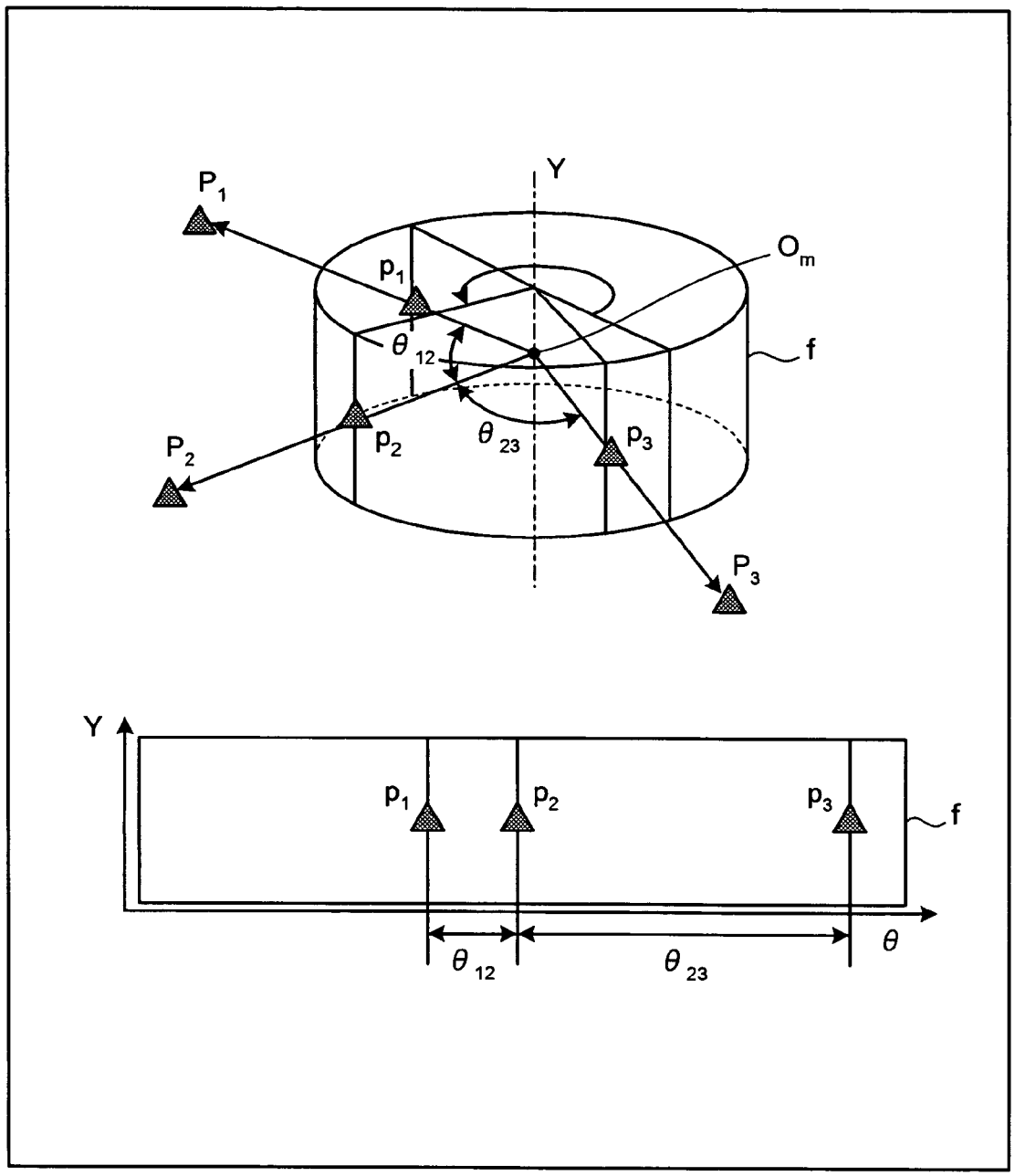
FIG. 17 is a diagram showing an example of an all-direction camera image and a relevant optical system.
Figure 18:
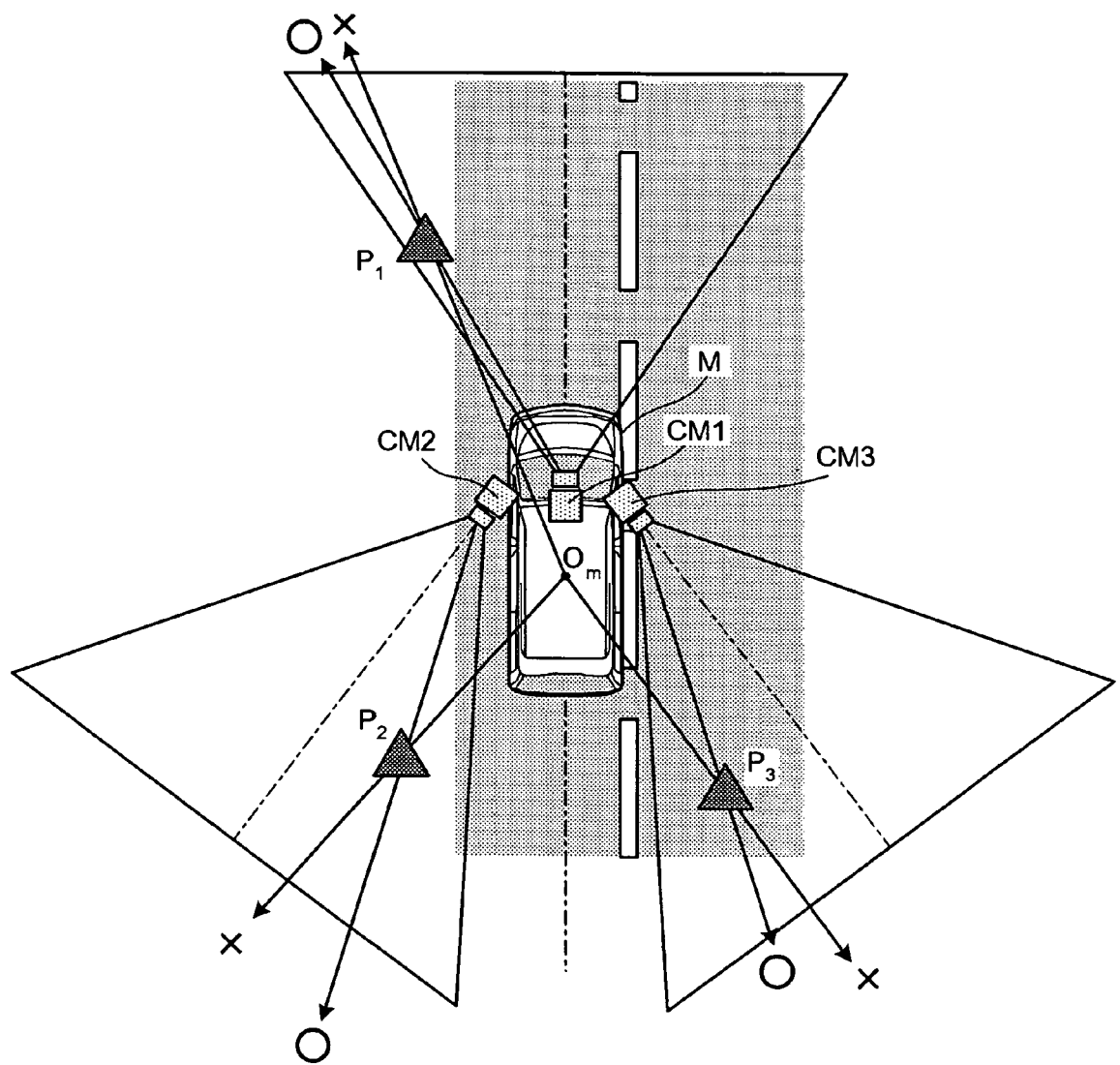
FIG. 18 is a diagram-showing an installation example for a plurality of cameras on a vehicle.

FIG. 15 is a diagram showing the neighboring four points to the focused point ($\lambda_{ij}$, $\lambda_{jk}$). As shown in FIG. 15, the neighboring four points (indicated by reference characters 1501 to 1504) to the focused point ($\lambda_{ij}$, $\lambda_{jk}$) indicated by 1500 becomes a value increased/decreased by the step width $\Delta\lambda$ according to the coordinate system of evaluation function F shown in FIG. 8.

As shown in FIG. 14, whether all of the values of the evaluation function F corresponding to the neighboring four points are greater than a value of the evaluation function F of the focused point ($\lambda_{ij}$, $\lambda_{jk}$) is judged (step S1403). In case that any one out of four values of the evaluation function F corresponding to the neighboring four points is equal to or less than the value of the evaluation function F ($\lambda_{ij}$, $\lambda_{jk}$) (step S1403: No), the process sets the coordinate value having the minimum value among values of evaluation function F corresponding to the four neighboring points (any one of 1501 to 1504) to a new focused point ($\lambda_{ij}$, $\lambda_{jk}$) (step S1404), and returns to step S1402.

On the other hand, in case that all of the values of the evaluation function F corresponding to the neighboring four points is greater than the value of the evaluation function F of the focused point ($\lambda_{ij}$, $\lambda_{jk}$) (step S1403: Yes), whether the step width $\Delta\lambda$ is less than a threshold value $\lambda t$ (for example, $\lambda t = \pi/1000$) is judged (step S1405).

When the step width $\Delta\lambda$ is equal to or greater than the threshold value $\lambda t$ (step S1405: No), the process makes the step width $\Delta\lambda$ small to ½ (step S1406) and returns to step S1402. On the other hand, if the step width $\Delta\lambda$ was smaller than the threshold value $\lambda t$ (step S1405: Yes), the process decides to take the finally obtained focused point ($\lambda_{ij}$, $\lambda_{jk}$) as the value of the variable ($\mu_{ij}$, $\mu_{jk}$) (step S1407).

In this way, the process is completed judging that a sufficiently accurate solution was obtained. Although this variable decision process is a numerical analysis method in the angle space of $\mu$, even if this is done in the same orthogonal coordinate space as the global coordinate system 303, if minimization of the evaluation function F is executed as the result, the same result is obtained.

A moving object locating method described in a form of implementation of this invention can be realized by executing a prepared program on a computer such as a personal computer or a work station. This program is recorded on readable storage media such as a hard disk, a flexible disk, a CD-ROM, an MO, a DVD that can be read by a computer, and is executed by being loaded to a computer from these recording media. This program can be a transmission media that can be delivered to users via networks such as the internet.

According to the embodiments described above, it is possible to increase the camera installation flexibility on a moving object as well as to increase accuracy in locating the moving object.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A computer-readable recording medium that stores therein a program for locating a moving object by using a plurality of images taken outside the moving object with a plurality of cameras mounted on the moving object, the program causing a computer execute:

detecting a position and a direction for a first marker, a second marker, and a third marker contained in the images;

identifying a first origin trajectory relating to an unknown origin position for the moving object based on the first marker and the second marker;

identifying a second origin trajectory relating to the unknown origin position based on the second marker and the third marker;

locating the unknown origin position at coordinates of an intersecting point of the first origin trajectory and the second origin trajectory;

calculating a first virtual optical center having a field of vision that includes the first marker and the second marker, and a second virtual optical center having a field of vision that includes the second marker and the third marker;

calculating a first inter-marker angle between the first marker and the second marker having a vertex at the first virtual optical center and a second inter-marker angle between the second marker and the third marker having a vertex at the second virtual optical center;

identifying the first origin trajectory such that the first inter-marker angle, a distance between the first virtual optical center and the unknown origin position, and an angle formed between a line from the first virtual optical center to the second marker and a line from the first virtual optical center to the unknown origin position remain constant; and identifying the second origin trajectory such that the second inter-marker angle, a distance between the second virtual optical center and the unknown origin position, and an angle formed between a line from the second virtual optical center to the third marker and a line from the first virtual optical center to the unknown origin position remain constant.

2. The computer-readable recording medium according to claim 1, wherein the program further causes the computer to execute:

deciding a first variable and the a second variable such that an evaluation function that evaluates a difference by numerical analysis is minimized, the difference between a function expressing the first origin trajectory and a function expressing the second origin trajectory when a first function that expresses the first origin trajectory is defined by using the first variable and a second function that expresses the second origin trajectory is defined by using the second variable;

locating the unknown origin position at the intersecting point by assigning the first variable to the first function and by assigning the second variable to the second function.

3. The computer-readable recording medium according to claim 2, wherein when a first marker circle function is defined by using the first variable that expresses the first marker circle on which the first marker, the second marker, and the first virtual optical center exist, and a second marker circle function is defined by using the second variable that expresses a second marker circle on which the second marker, the third marker, and the second virtual optical center exist, the locating includes locating an azimuthal angle of the moving object by assigning the first variable to the first marker circle function and by assigning the second variable to the second marker circle function.

4. The computer-readable recording medium according to claim 3, wherein the program further causes the computer to execute repeating the detecting, the identifying, and the locating using the moving object origin position and the azimuth direction, when the position and the direction of the first marker, the second marker, and the third marker are detected by using the position and the azimuth direction of the moving object obtained from a global positioning system and an electronic compass mounted on the moving object.

5. An apparatus for locating a moving object by using a plurality of images taken outside the moving object with a plurality of cameras mounted on the moving object, the apparatus comprising:

a detecting unit that detects a position and a direction for a first marker, a second marker, and a third marker contained in the images;

a first identifying unit that identifies a first origin trajectory relating to an unknown origin position for the moving object based on the first marker and the second marker;

a second identifying unit that identifies a second origin trajectory relating to the unknown origin position based on the second marker and the third marker;

a locating unit that locates the unknown origin position at coordinates of an intersecting point of the first origin trajectory and the second origin trajectory;

a first virtual optical center calculating unit that calculates a first virtual optical center having a field of vision that includes the first marker and the second marker;

a second virtual optical center calculating unit that calculates a second virtual optical center having a field of vision that includes the second marker and the third marker;

a first inter-marker angle calculating unit that calculates a first inter-marker angle between the first marker and the second marker having a vertex at the first virtual optical center; and a second inter-marker angle calculating unit that calculates a second inter-marker angle between the second marker and the third marker having a vertex at the second virtual optical center, wherein the first identifying unit identifies the first origin trajectory such that the first inter-marker angle, a distance between the first virtual optical center and the unknown origin position, and an angle formed between a line from the first virtual optical center to the second marker and a line from the first virtual optical center to the unknown origin position remain constant, and the second identifying unit identifies the second origin trajectory such that the second inter-marker angle, a distance between the second virtual optical center and the unknown origin position, and an angle formed between a line from the second virtual optical center to the third marker and a line from the first virtual optical center to the unknown origin position remain constant.

6. A method of locating a moving object by using a plurality of images taken outside the moving object with a plurality of cameras mounted on the moving object, the method comprising:

detecting a position and a direction for a first marker, a second marker, and a third marker contained in the images;

identifying a first origin trajectory relating to an unknown origin position for the moving object based on the first marker and the second marker;

identifying a second origin trajectory relating to the unknown origin position based on the second marker and the third marker;

locating the unknown origin position at coordinates of an intersecting point of the first origin trajectory and the second origin trajectory;

calculating a first virtual optical center having a field of vision that includes the first marker and the second marker, and a second virtual optical center having a field of vision that includes the second marker and the third marker;

calculating a first inter-marker angle between the first marker and the second marker having a vertex at the first virtual optical center and a second inter-marker angle between the second marker and the third marker having a vertex at the second virtual optical center;

identifying the first origin trajectory such that the first inter-marker angle, a distance between the first virtual optical center and the unknown origin position, and an angle formed between a line from the first virtual optical center to the second marker and a line from the first virtual optical center to the unknown origin position remain constant; and identifying the second origin trajectory such that the second inter-marker angle, a distance between the second virtual optical center and the unknown origin position, and an angle formed between a line from the second virtual optical center to the third marker and a line from the first virtual optical center to the unknown origin position remain constant.

* * * * *